United States Patent [19]

Nishimura et al.

[11] Patent Number: 4,906,506
[45] Date of Patent: Mar. 6, 1990

[54] PREFORMED MATERIAL FOR FIBER REINFORCED PLASTICS

[75] Inventors: Akira Nishimura, Otsu; Kazuo Kito, Kyoto, both of Japan

[73] Assignee: Toray Industries, Inc., Tokyo, Japan

[21] Appl. No.: 133,922

[22] Filed: Dec. 16, 1987

[30] Foreign Application Priority Data

Dec. 16, 1986 [JP] Japan .................. 61-297694

[51] Int. Cl.⁴ .............................................. B32B 5/12
[52] U.S. Cl. .................................... 428/113; 428/198; 428/257; 428/258; 428/296
[58] Field of Search ............... 428/113, 257, 258, 296, 428/198

[56] References Cited

U.S. PATENT DOCUMENTS

| 4,320,160 | 3/1982 | Nishimura et al. | 428/107 |
| 4,388,365 | 6/1983 | Hasegawa | 428/259 |
| 4,680,213 | 7/1987 | Fourezon | 428/259 |
| 4,719,144 | 1/1988 | Kamat | 428/259 |

FOREIGN PATENT DOCUMENTS 58-39442  3/1983  Japan .

OTHER PUBLICATIONS

"Plastic Processing Technology Handbook," 7-30-75, Shinbunsha, p. 402.

Primary Examiner—Marion C. McCamish
Attorney, Agent, or Firm—Birch, Stewart Kolasch & Birch

[57] ABSTRACT

A preformed material for use in fiber reinforced plastics is formed by laminating and integrally bonding a plurality of sheet-like substrates comprising reinforcing fibers. At least one of the laminated substrates is a woven fabric substrate having bonding material composed of a thermoplastic polymer pre-adhering to the substrate and extending substantially linearly along reinforcing yarns or auxiliary filamentary yarns of the substrate. Due to the bonding material the substrates of the preformed material are effectively bonded to each other even if the amount of the bonding material is small, no deterioration occurs in the arrangement and the distribution of the reinforcing fibers, no dislocation of the substrates occurs during a manufacturing process, and excellent characteristics of and a high productivity for forming the fiber reinforced plastics can be obtained.

58 Claims, 36 Drawing Sheets

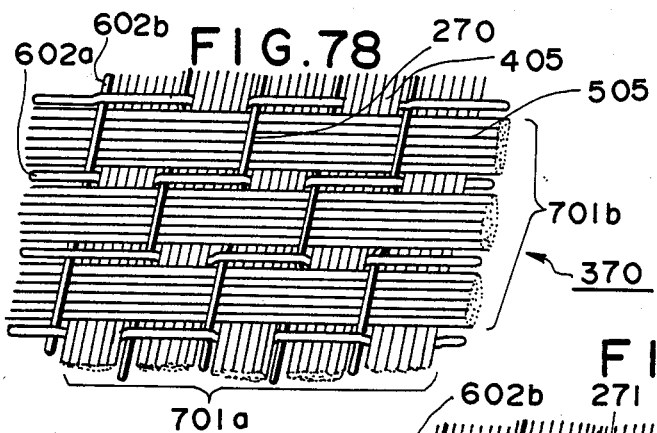

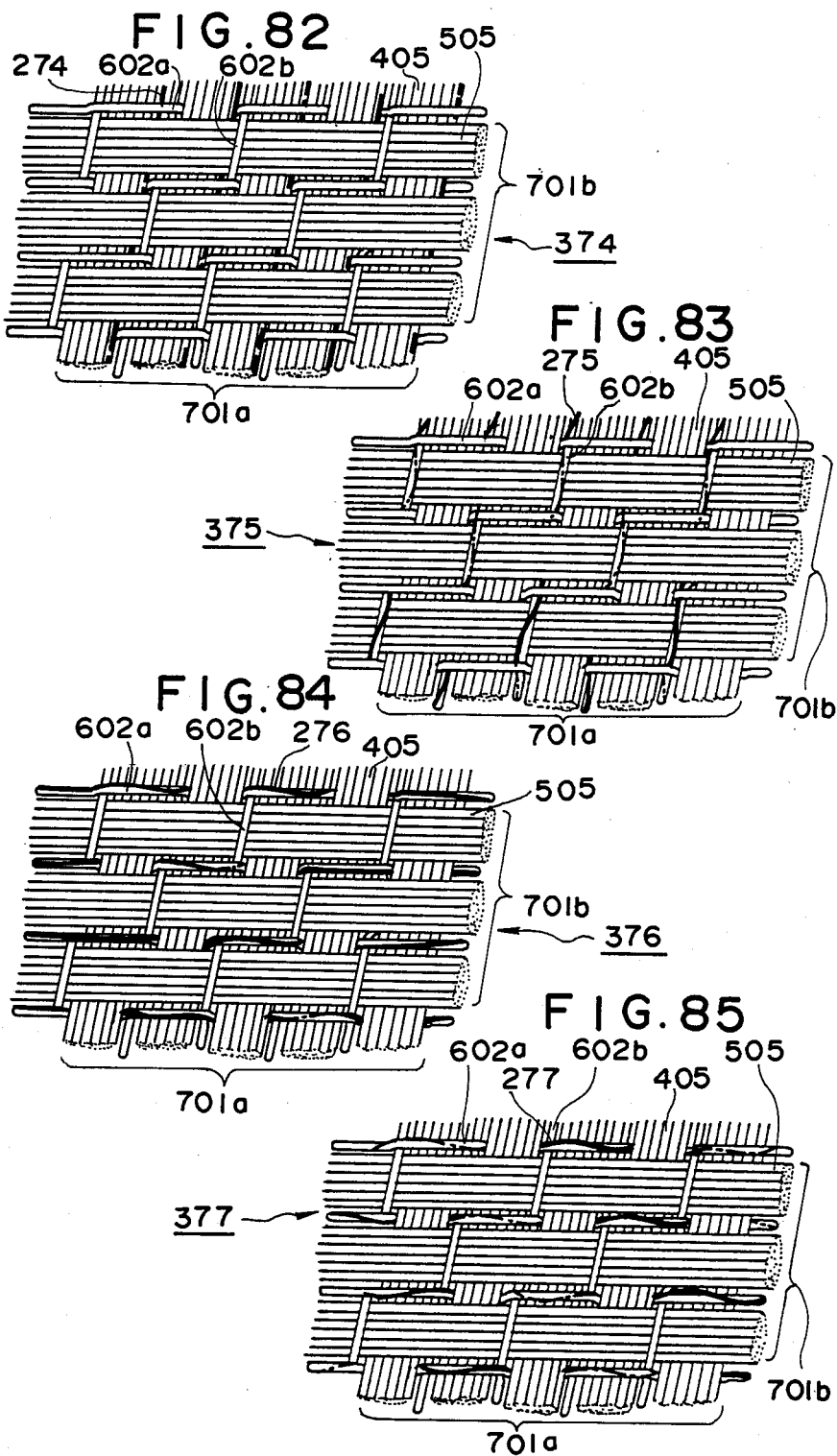

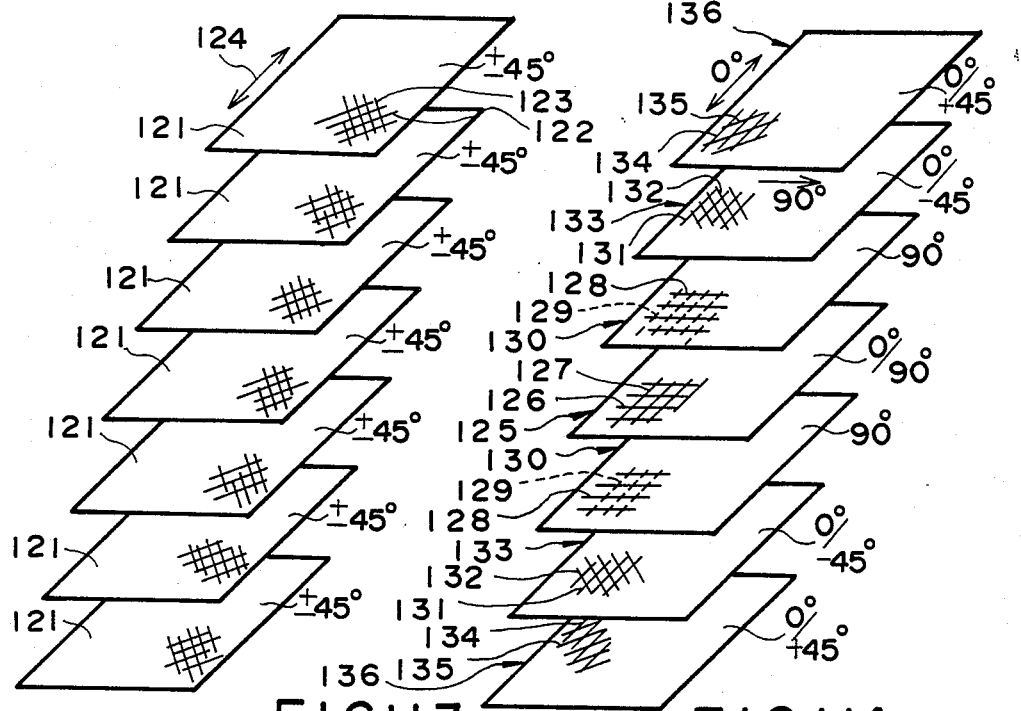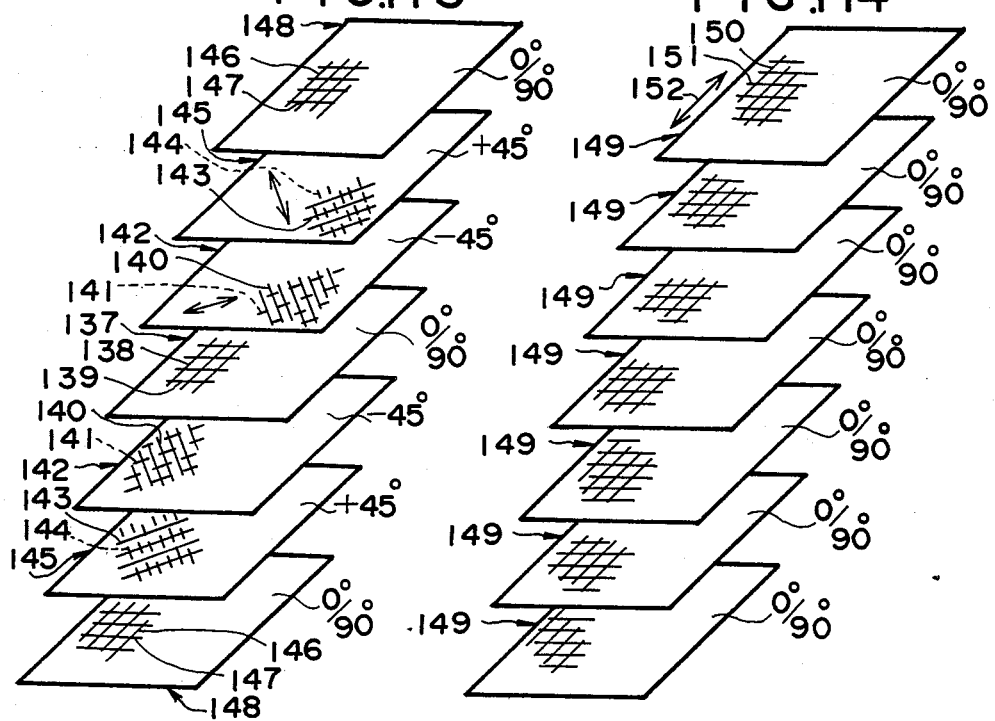

PREFORMED MATERIAL FOR FIBER REINFORCED PLASTICS

BACKGROUND OF THE INVENTION

1. Field of the Invention

The present invention relates to a material preformed to a required shape for use in fiber reinforced plastics (hereinafter referred to as FRP) in order to reinforce a matrix resin of an FRP when the FRP is formed.

2. Description of the Prior Art

Various methods for forming FRP are well known, and generally what type of method should be adopted is decided in accordance with required properties and output of production of an FRP. For instance, in the case where relatively high mechanical properties are required for an FRP but the number of products is small, an autoclave molding process is often adopted for the FRP. In the case where high mechanical properties are not required for an FRP but the number of products is relatively great, a hand lay up molding method is often adopted for the FRP. Further, a resin injection molding method for the case where the number of products is 500–1000 as a middle class of production scale, and a continuous pultrusion molding method where the number of products is more than the above number are generally adopted respectively. However, in the case where fibers, such as carbon fibers, which have a high strength and a high elastic modulus (Young's modulus) but are expensive are employed as reinforcing fibers for an FRP, the resin injection molding method and the continuous pultrusion molding method are not so often adopted. The reason why the methods are not so often adopted is that the arrangement or distribution of the reinforcing fibers tends to be disturbed when the FRP is formed, thereby decreasing the reinforcing effect according to high characteristic properties of carbon fibers etc., as described hereinafter. Therefore advantages according to use of carbon fibers etc. decrease.

To explain the above problems in detail, a resin injection molding method is a method wherein, after dry sheet-like substrates composed of reinforcing fibers are laminated and charged into a cavity defined by male and female molds, a resin is injected into the cavity and the resin is impregnated into the substrates. The resin is then cured. In this method, the preformed material composed of laminated substrates tends to get out of shape, particularly when the substrates are laminated to a complicated shape. Moreover, there is a problem that the substrates are moved by the pressure applied when the resin is injected, thereby changing the laminated state of the substrates. This causes a disturbance of the arrangement or the distribution of the reinforcing fibers in the preformed material.

A continuous pultrusion molding method is a method wherein sheet-like substrates are drawn from creels, a resin is impregnated into the drawn and laminated substrates, the substrates into which the resin is impregnated are shaped and the resin is cured by passing the substrates through a heated die, and the obtained FRP is then continuously drawn to a puller. Also in this method, a disturbance of the orientation or the distribution of the reinforcing fibers in the preformed material tends to occur on account of the deflection of the substrates due to the weight of the resin or the wrinkles of the substrates generated during the process, particularly after the resin is impregnated.

On the other hand, the following preformed material is disclosed in page 402 of Plastic Processing Technology Handbook published on July 30, 1975 by Nikkan Kogyo Shinbunsha of a Japanese company. The preformed material is formed by laminating substrates composed of reinforcing fibers to a required shape and bonding the substrates to each other with chips made by cutting a substrate of reinforcing fibers in which a resin is impregnated or with powders of a thermoplastic material. However, this forming method also has a problem that the characteristic properties of carbon fibers etc. cannot be sufficiently obtained.

Therefore, in the case where the chips are employed, non-uniform FRP tends to be obtained because the volume fraction of fibers contained in the portion of the FRP where the chips are becomes locally higher than in other portions. Moreover, in the case where the substrates are composed of long fibers or filamentary yarns, since the short fibers of the chips exist between the substrates, stress concentrates at the portions where the chips are and the fracture of the FRP tends to begin from the portions relatively early.

On the other hand, in the case where the thermoplastic powders are employed, since it is difficult to distribute the powder uniformly on the substrates, fairly large non-uniformity occurs in accordance with the distribution of the powders. Accordingly, in order to provide the laminated substrates with a necessary bonding strength required for a preformed material, the amount of the powders should be relatively large. Since the powders do not constitute the matrix of the FRP, however, the increase in the amount of the powders deteriorates the properties of the FRP.

Furthermore, JP-A-58-39442 discloses a preformed material formed by disposing webs, composed of short heat-melting fibers and formed as a mat, a strip or a grid between a mat of glass fibers and a woven fabric of glass fibers, and bonding the mat and the woven fabric by melting the webs. However, this preformed material has problems similar to the problems in the aforementioned materials.

Therefore, in the case where the web is formed as a mat wherein the short fibers are arranged in random directions on the surface of the mat, since such a mat ordinarily has a large non-uniformity in accordance with the distribution of the short fibers, it becomes necessary to increase the amount of webs used for providing a required bonding strength for a preformed material. Since the webs do not constitute the matrix of the FRP even if the webs melt, the increase in the number of webs causes a deterioration in the properties of the FRP. Moreover, with respect to a woven fabric, convex portions of the bending weaving yarns of the woven fabric are the most suitable portions for effective bonding. However, when the webs formed as a mat melt, the molten materials adhere not only to the convex portions but also to concave portions and mesh portions, that is, the portions where the weaving yarns do not exist. This causes a very great increase in the amount of the webs required and an adequate impregnation of a resin becomes difficult when an FRP is formed.

In the case where the webs formed as a strip or a grid are employed, the arrangement of the short fibers is usually performed so as to form straps. Since it is extremely difficult to adapt the pitch of the straps to the pitch of the convex portions which are the most suitable portions for bonding, not only an effective bonding becomes difficult but also the amount of the webs increases in order to obtain an adequate bonding strength for a preformed material. There occur similar problems even if the short fibers are arranged in fine yarn-like shapes.

SUMMARY OF THE INVENTION

An object of the present invention is to provide a preformed material for FRP in which (a) substrates of reinforcing fibers can be bonded to each other by fairly small amounts of bonding materials efficiently and with a sufficient bonding strength, (b) disturbances of the arrangement and distribution of the reinforcing fibers when the preformed material is formed as a required shape or when an FRP is molded can be minimized and (c) the content of any resin other than a matrix resin can be kept to a minimum value, thereby obtaining an FRP having excellent characteristics.

Another object of the present invention is to provide a preformed material in which substrates of reinforcing fibers can be easily bonded to each other and can be easily manufactured even if the preformed material has a complicated shape, thereby achieving excellent productivity.

To accomplish the above objects, a preformed material for use in FRP according to the present invention comprises: a plurality of sheet-like substrates comprising reinforcing fibers and laminated with each other, at least one of adjacent substrates being a woven fabric substrate which has reinforcing yarns of reinforcing fibers extending at least in one direction; and bonding material composed of a thermoplastic polymer, the bonding material pre-adhering to the woven fabric substrate and integrally bonding the woven fabric substrate to the substrate adjacent to the woven fabric substrate.

The preformed material may be a material wherein adjacent sheet-like substrates to each other are both woven fabric substrates which have been provided with the bonding material, or may be a material wherein one only of adjacent sheet-like substrates integrally bonded by bonding material is the woven fabric substrate which has been provided with the bonding material, the other being a sheet-like substrate composed of reinforcing fibers, which may be selected from the group consisting of a woven fabric, a mat of short fibers or a mat of long fibers such as a chopped strand mat, a continuous strand mat or a surface mat, or a felt.

The reinforcing fibers used in a preformed material according to the present invention are the fibers which are ordinarily used as the fibers for reinforcing the resin of FRP, for example, carbon fibers, glass fibers, polyaramide fibers, silicon carbide fibers, alumina fibers, alumina-silica fibers or metallic fibers. Among these fibers, carbon fibers are the most preferable. Of course, more than two types of fibers may be mixed, as is often performed in conventional manufacturing methods. The reinforcing fibers employed in the present invention have a tensile strength of more than 250 Kg/mm$^2$ (2450 N/mm$^2$) and a tensile elastic modulus (tensile Young's modulus) of more than $7 \times 10^3$ Kg/mm$^2$ ($69 \times 10^3$ N/mm$^2$).

The thermoplastic polymer constituting the bonding material is a polymer having a relatively low melting point such as nylon, copolymerized nylon, polyester, vinylidene chloride and vinyl chloride. Among these polymers, copolymerized nylon, which can melt at the temperature of impregnation of a matrix resin such as an epoxy resin and which has good adhesion with the matrix resin, is the most desirable. Such copolymerized nylon can be selected from the group consisting of copolymerized nylon 6 and nylon 12, copolymerized nylon 6 and nylon 66, copolymerized nylon 6, nylon 66 and nylon 610 and copolymerized nylon 6, nylon 12, nylon 66 and nylon 610.

The bonding material according to the present invention is employed only for the purpose of integrally bonding the substrates, and not as a matrix for FRP. Therefore, the amount of the bonding materials is preferably as little as possible. From this point of view, the amount of the bonding material pre-adhering to the woven fabric substrate in a preformed material according to the present invention is very small, in the range of 0.2–10 wt. %, preferably 0.2–4 wt. %, more preferably 0.2–1.5 wt. % of the reinforcing fibers, although the amount varies according to the arrangement, pitch or size of the warps and wefts, or the type of the bonding material which adheres thereto.

The woven fabric may be formed, for example, by weaving monofilament yarns, multifilament yarns or slit yarns composed of a thermoplastic polymer together with the warps and wefts composed of reinforcing fibers, and then softening or melting the thermoplastic polymer yarns by heating.

In a preformed material according to the present invention, the preferable cross sectional area of the reinforcing yarn of the woven fabric substrate is in the range of 0.03–0.60 mm$^2$, more preferably 0.10–0.40 mm$^2$. The preferable weight of the woven fabric substrate is in the range of 60–700 g/m$^2$, more preferably 150–300 g/m$^2$. If the weight is less than 60 g/m$^2$, the productivity is not so good because many woven fabric substrates must be laminated in order to obtain a preformed material with a required thickness, thereby increasing the manufacturing time. If the weight is more than 700 g/m$^2$, the crimp of the weaving yarns becomes large. The large crimp causes a large stress concentration in the FRP, thereby deteriorating the properties of the FRP. Thus such a large woven fabric weight is undesirable.

The weave structure of the woven fabric substrate is preferably a plain weave from the viewpoint of a high utilization factor of the reinforcing fibers, but it may be another weave structure such as a twill weave or a satin weave. Also it may be a so called non-crimp fibrous structure, such as that disclosed in JP-A-55-30974 or U.S. Pat. No. 4,320,160, which comprises: a yarn group A composed of a plurality of straight reinforcing yarns gathered in one direction parallel to one another in the form of a sheet, a yarn group B composed of a plurality of straight reinforcing yarns gathered in another direction parallel to one another in the form of a sheet, and auxiliary filamentary yarns integrally holding the yarn groups A and B.

The preformed material according to the present invention is formed by laminating a plurality of sheet-like substrates so as to form a required shape. After the lamination, the bonding material composed of a thermoplastic polymer between adjacent substrates is heated, thereby integrally bonding the substrates as a result of the adhesive strength of the bonding material.

BRIEF DESCRIPTION OF THE DRAWINGS

The accompanying drawings illustrate several embodiments of the invention and together with the description serve to explain the principles of the invention.

FIGS. 78–86 are schematic plan views of woven fabric substrates, showing various adhesive states of bonding materials in accordance with a woven fabric substrate having a non-crimp fibrous structure according to the present invention;

FIGS. 111–118 are schematic exploded perspective views of preformed materials showing typical lamination structures of woven fabric substrates.

DETAILED DESCRIPTION OF THE PREFERRED EMBODIMENTS

Figure 1:
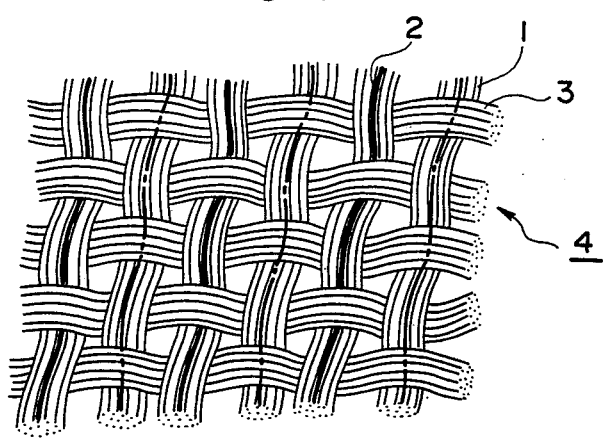
FIGS. 1–4 are schematic plan views of woven fabric substrates according to different embodiments of the present invention.

The illustrated preferred embodiments of the present invention will be described hereafter referring to the accompanying drawings wherein like reference numerals refer to similar parts;

First, how the bonding material composed of a thermoplastic polymer pre-adheres to a woven fabric substrate is explained with respect to typical types of substrates.

In FIG. 1, a woven fabric substrate 4 is formed as a plain weave and comprises warps 1 and wefts 3 composed of multifilaments of reinforcing fibers and bonding material 2 composed of a thermoplastic polymer which pre-adheres to the warps and extends substantially linearly along the warps in the longitudinal direction of the warps at the central portions of the multifilaments. The bonding material 2 is situated alternately on the front and back surfaces of successive warps 1, that is, on the front and back surfaces of the woven fabric substrate 4. In this embodiment, since the bonding material 2 pre-adheres to the convex portions of the bending warps 1, bonding of the substrate 4 and an adjacent substrate (not shown) laminated with the substrate 4 can be effectively performed. Since the bonding material 2 pre-adheres to the back surface of the substrate 4 as well as to the front surface, bonding with other substrates can be performed on both surfaces of the substrate 4.

Figure 2:
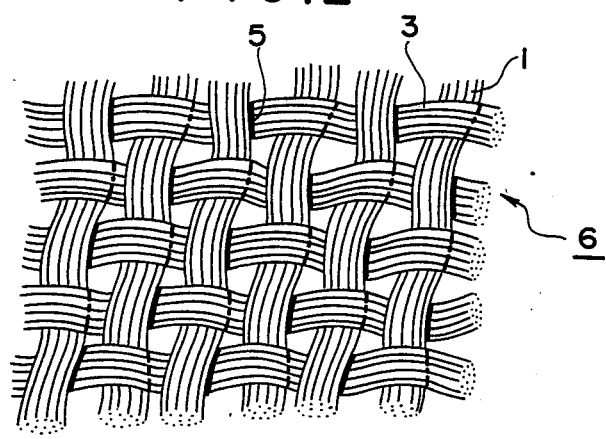

As shown in FIG. 2, bonding material 5 may extend along the warps 1 on the side portions of the warps. In a woven fabric substrate 6 of this embodiment, although the bonding material 5 intermittently extends along the warps 1, the bonding material extends substantially linearly as a whole.

Figure 3:
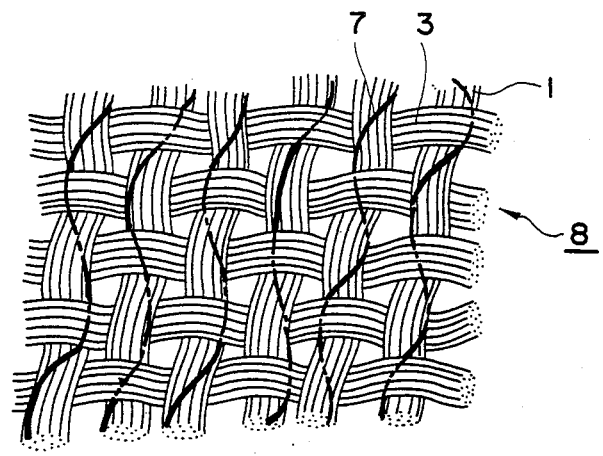

As shown in FIG. 3, bonding material 7 may extend along the warps 1 so as to spirally wind around the warps. Also in this substrate 8, the bonding material 7 extends substantially linearly along the warps 1 as a whole.

In the woven fabric substrates shown in FIGS. 1–3, since the bonding material pre-adheres to the intersecting portions of the warps 1 and the wefts 3, the warps and the wefts are bonded by the bonding material and the adhesion between the warps and the wefts can be sufficiently maintained. By this effect, the loosening of the substrate can be prevented when it is treated or cut.

Figure 4:
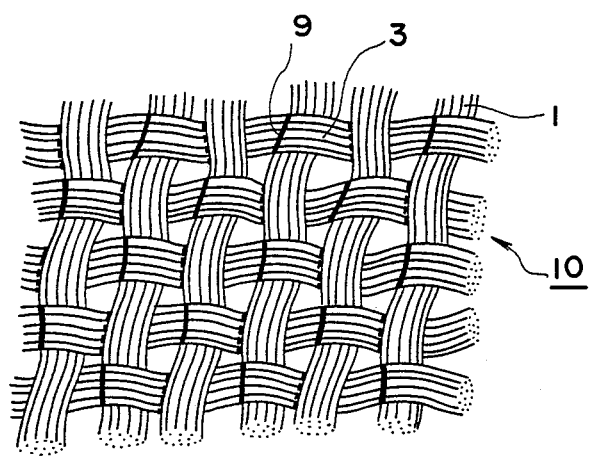

As shown in FIG. 4, bonding material 9 may pre-adhere on the convex portions of the bending wefts 3, although the above-mentioned fixing effect cannot be obtained in this substrate 10. Since the warps 1 and the wefts 3 are not fixed to each other by the bonding material 9, the draping property (property of following to a shape) of the substrate 10 is much better than that of the substrates shown in FIGS. 1–3.

Although the bonding material pre-adhere to all the warps 1, it may pre-adhere to the warps or the wefts at intervals of a plurality of yarns, for example, on every second yarn or every third yarn. Further, the bonding material may extend along both the warps and wefts. Thus, the bonding materials extend along at least one of the warps and wefts, substantially linearly and continuously or intermittently.

Next, in FIGS. 5–10, how the adhesive state of the bonding material changes according to the heat treatment condition after weaving warps, wefts and thermoplastic polymer yarns into the woven fabric substrate is explained. The reason why the thermoplastic polymer yarns are heat-treated and softened or melted after the weaving is to prevent the warps and wefts from snaking due to delayed action of thermal shrinkage of the thermoplastic polymer yarns.

Figure 5:
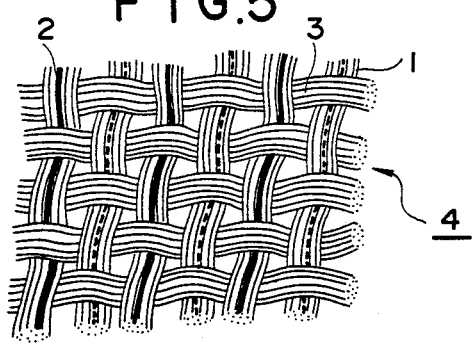
FIGS. 5–7 are schematic plan views of woven fabric substrates, showing different adhesive states of bonding materials corresponding to different heat treatment conditions in accordance with the woven fabric substrate shown in FIG. 1.
Figure 6:
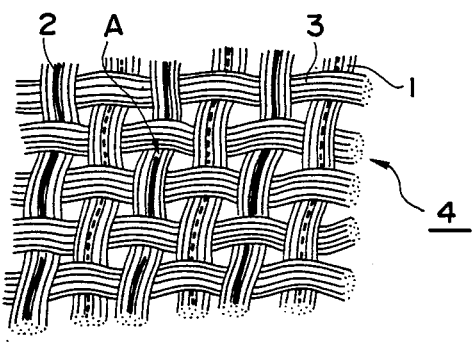
Figure 7:
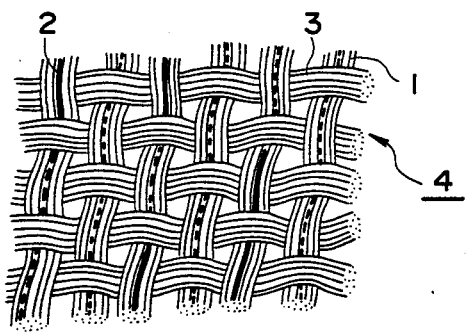

The woven fabric substrates illustrated in FIGS. 5–7 correspond to the substrate illustrated in FIG. 1, and a similar correspondence can be taken also with the substrate illustrated in FIG. 3. The woven fabric substrates illustrated in FIGS. 8–10 correspond to the substrate illustrated in FIG. 2, and a similar correspondence can be taken also with the substrate illustrated in FIG. 4.

FIG. 5 shows the case wherein thermoplastic polymer yarns are woven together with warps 1, and then the woven fabric is heat-treated at a temperature higher than 80° C. and lower than the melting point of the thermoplastic polymer yarns. Since the heating is performed at a temperature lower than the melting point, the thermoplastic polymer yarns are softened but not melted. Although the fixing of the warps 1 and the wefts 3 by the bonding material 2 made from the thermoplastic polymer yarns does not proceed very far, the snaking of the warps and wefts can be prevented because the thermal shrinkage of the thermoplastic polymer yarns does not occur. Since almost all the bonding material 2 composed of the thermoplastic polymer appears on a surface of the substrate 4 and the snaking of the warps 1 and the wefts 3 can be prevented as abovementioned, the substrate is very suitable for use as a substrate for a preformed material.

FIG. 6 shows the case wherein the substrate is heat-treated at a temperature between the melting point of the thermoplastic polymer yarns and 20° C. above the melting point. In this case, the thermoplastic polymer yarns begin to melt and the bonding material locally extends intermittently (for example, portion A), but the bonding material extends substantially linearly as a whole. Since the heat treatment temperature is relatively low, even if it is higher than the melting point, the bonding material 2 does not invade into the warps 1 or the wefts 3 and affect the appearance of the material on the surface of the substrate 4.

FIG. 7 shows the case wherein the substrate is heat-treated at a temperature between 20° and 50° C. above the melting point of the thermoplastic polymer yarns. Also in this case, the thermoplastic polymer yarns melt and the bonding material 2 locally extends intermittently, but the bonding material extends substantially linearly as a whole. However, since the heat treatment temperature is fairly high, part of the bonding material invades into the warps 1 and/or the wefts 3. In FIG. 7, broken lines show the bonding material invading into warps 1 or wefts 3 in addition to the bonding material adhering to the back surface of the substrate. The substrate in this state may be used in the present invention, but it is undesirable because part of the bonding material 2 invade into the warps 1 and the wefts 3 and the amount of the bonding material appearing on the surface of the substrate decreases accordingly.

Although an illustration is omitted, in the case where the substrate is heat-treated at a temperature higher than 50° C. above the melting point of the thermoplastic polymer yarns, a large amount of bonding material invades into the warps and wefts and only a small amount appears on the surface of the substrate, so such a substrate is undesirable as a substrate for a preformed material because the bonding ability of the substrate becomes very low.

Figure 8:
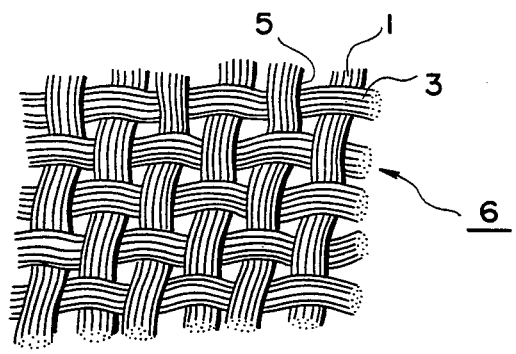
FIGS. 8–10 are schematic plan views of woven fabric substrates, showing different adhesive states of bonding materials corresponding to different heat treatment conditions in accordance with the woven fabric substrate shown in FIG. 2.

Next, FIG. 8 shows the case wherein thermoplastic polymer yarns are woven on the side portions of the warps 1 and then the woven fabric is heat-treated at a temperature higher than 80° C. and lower than the melting point of the thermoplastic polymer yarns. In this case, the snaking of the warps 1 and the wefts 3 can be prevented as well as in the case shown in FIG. 5. The substrate 6 in this state is very suitable for use as a substrate for preformed materials.

Figure 9:
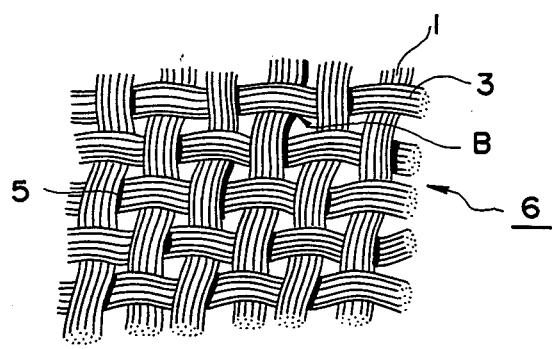

FIG. 9 shows the case wherein the substrate is heat-treated at a temperature between the melting point of the thermoplastic yarns and 20° C. above the melting point. In this case, the thermoplastic polymer yarns melt and the formed bonding material 5 extend intermittently along the warps 1. 5–10% of the bonding material extends continuously, for example, at portion B. Since the bonding material 5 adheres to the portions where the warps 1 and the wefts 3 intersect, the warps and the wefts are appropriately fixed. Since meshes of the substrate 6 are not filled with the bonding material 5, the draping property of the substrate can be sufficiently ensured. The bonding material 5 appears on the side portions of the warps 1 and the adhesive ability of the substrate 6 to other substrates laminated onto the substrate 6 can be maintained sufficiently high.

Figure 10:
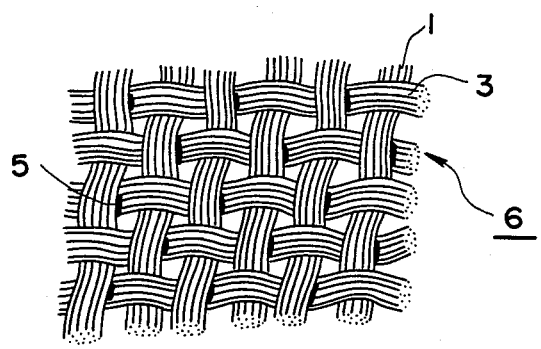

FIG. 10 shows the case wherein the substrate is heat-treated at a temperature between 20° and 50° C. above the melting point of the thermoplastic polymer yarns. The thermoplastic polymer yarns completely melt and the formed bonding material 5 extends intermittently. This substrate, as well as the substrate shown in FIG. 9, can be used as a substrate for a preformed material.

Furthermore, although an illustration is omitted, in the case where the substrate is heat-treated at a temperature higher than 50° C. above the melting point of the thermoplastic polymer yarns, a large amount of bonding material invades into the warps and wefts and only a small amount of bonding material appears on the surface of the substrate, so such a substrate having a poor bonding ability is undesirable.

Next, various embodiments of a woven fabric substrate composed of reinforcing fibers for use for a preformed material according to the present invention are hereinafter explained in more detail.

FIGS. 11–41 show embodiments in accordance with a plain weave fabric, FIGS. 42–51 show embodiments in accordance with a biased plain weave fabric, FIGS. 52–57 show embodiments in accordance with a unidirectional biased plain weave fabric, FIGS. 58–67 show embodiments in accordance with a twill weave fabric, FIGS. 68–77 show embodiments in accordance with a satin weave fabric, FIGS. 78–86 show embodiments in accordance with a woven fabric having a non-crimp fibrous structure, and FIGS. 87–93 show embodiments in accordance with a woven fabric having a biased non-crimp fibrous structure.

Figure 11:
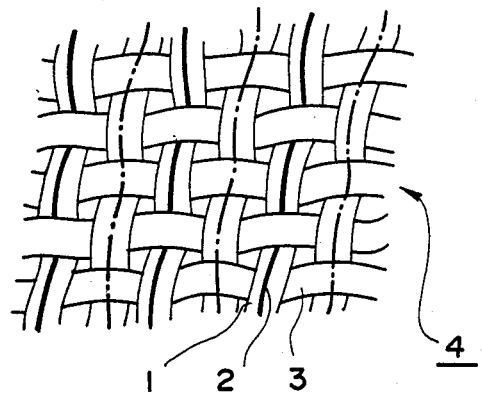
FIGS. 11–41 are schematic plan views of woven fabric substrates, showing various adhesive states of bonding materials in accordance with a woven fabric substrate having a plain weave structure according to the present invention.
Figure 12:
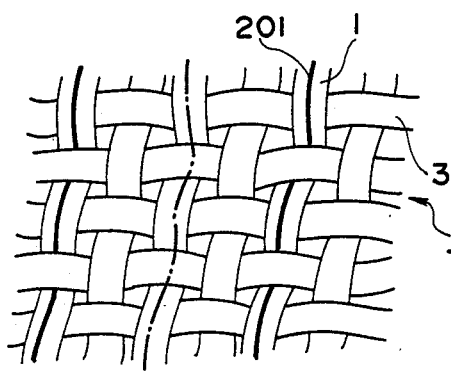
Figure 13:
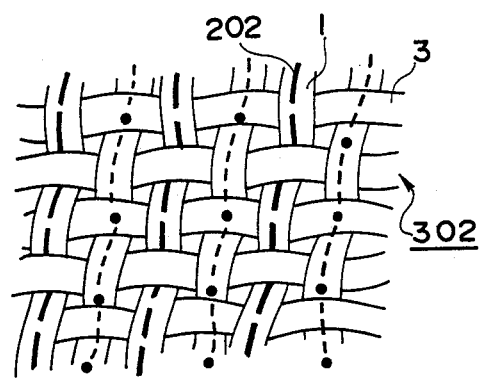
Figure 14:
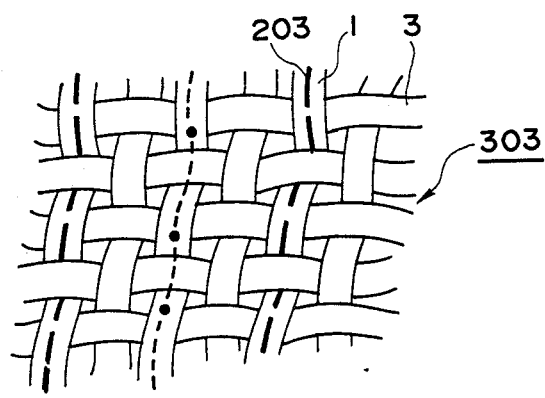
Figure 15:
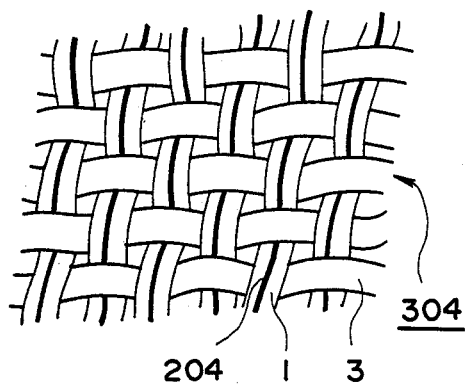
Figure 16:
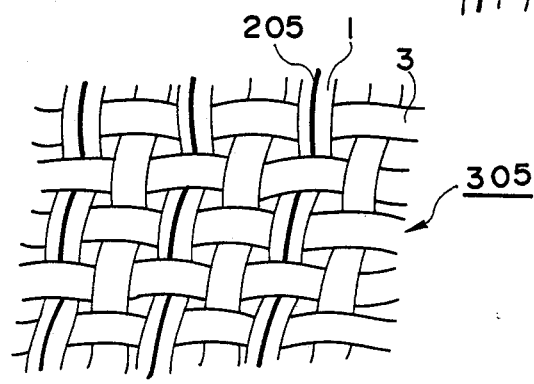
Figure 17:
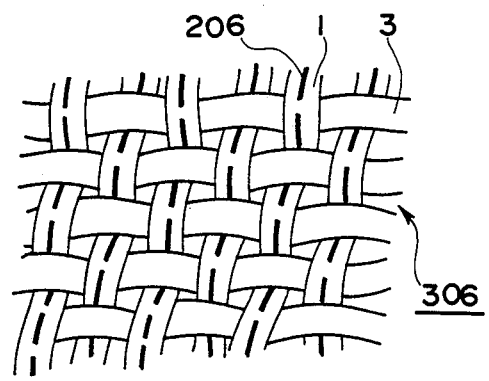
Figure 18:
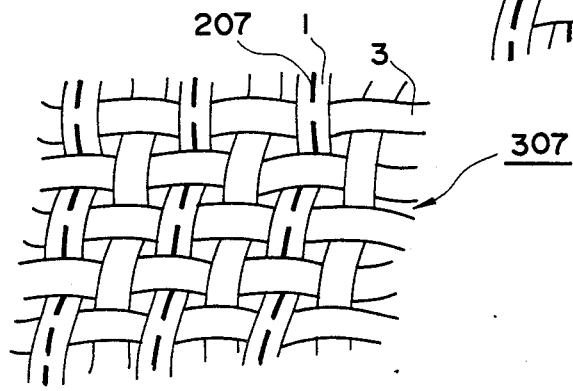
Figure 19:
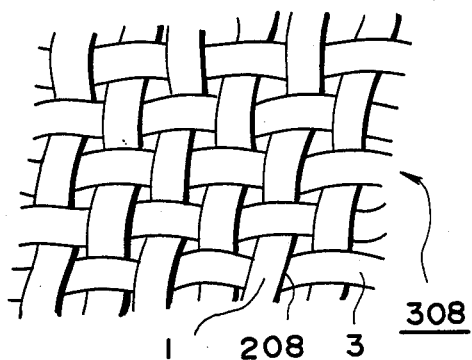
Figure 20:
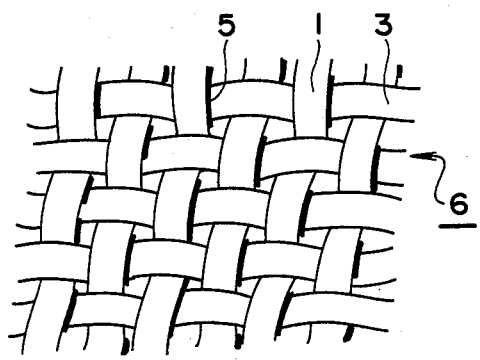
Figure 21:
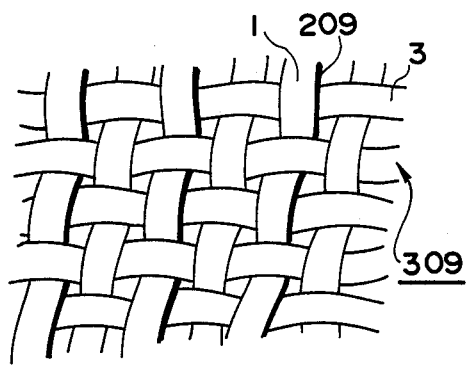
Figure 22:
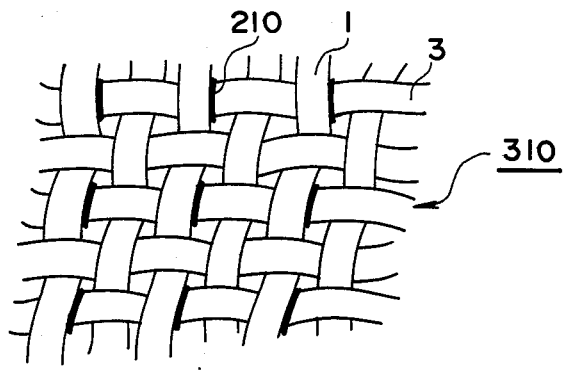
Figure 23:
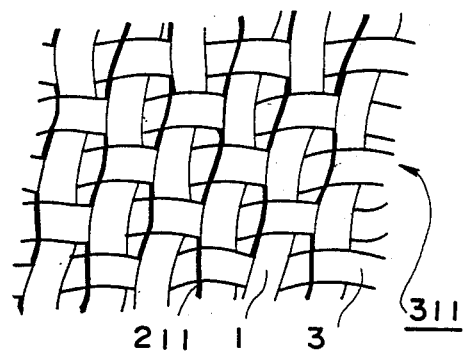
Figure 24:
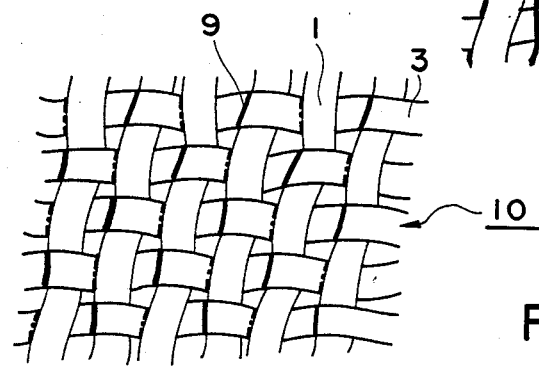
Figure 25:
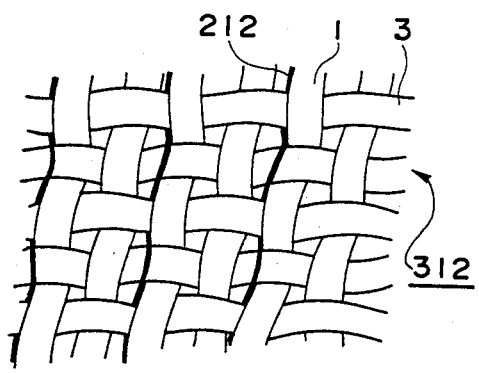
Figure 26:
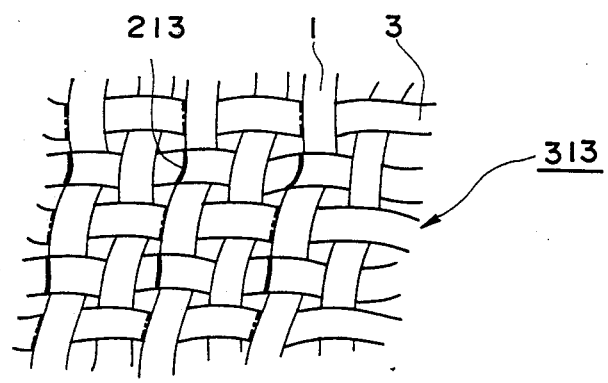
Figure 27:
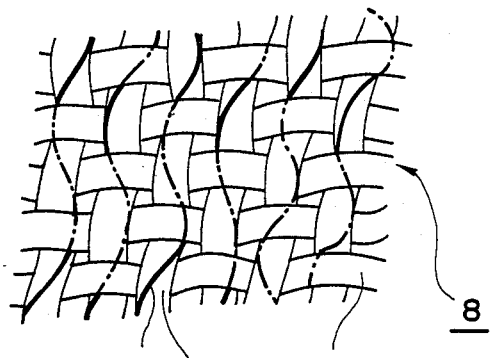
Figure 28:
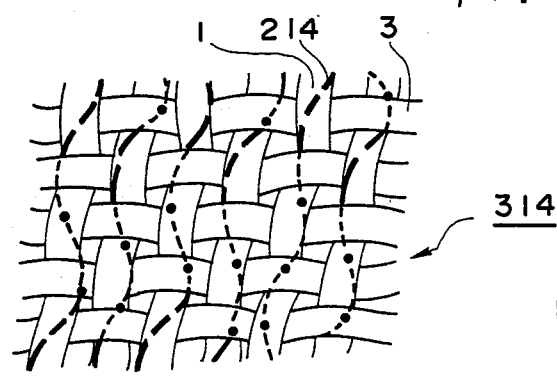
Figure 29:
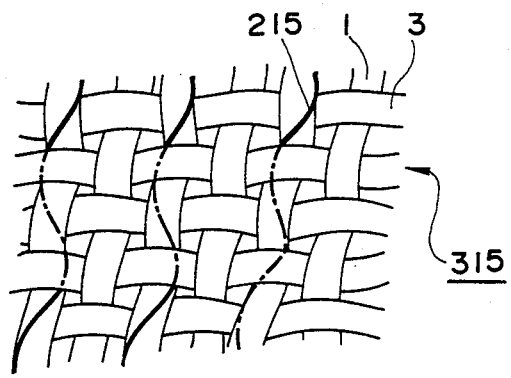
Figure 30:
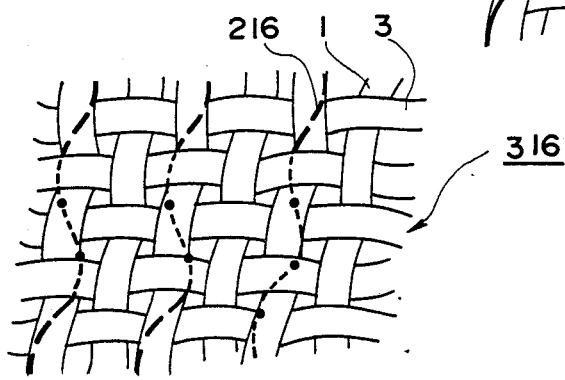
Figure 31:
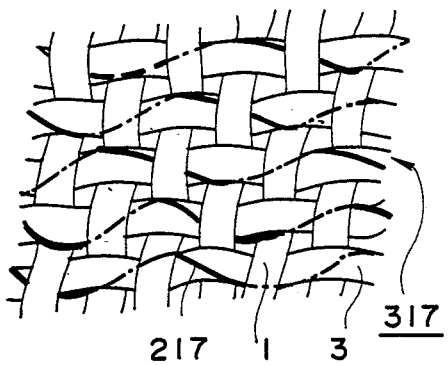
Figure 32:
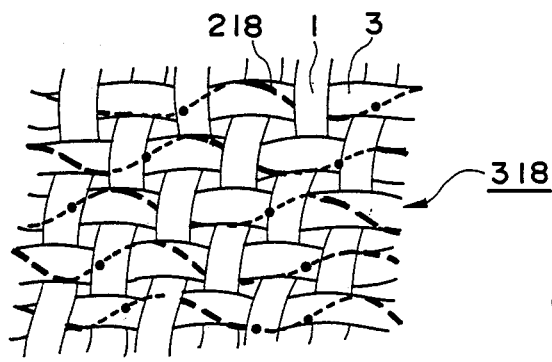
Figure 33:
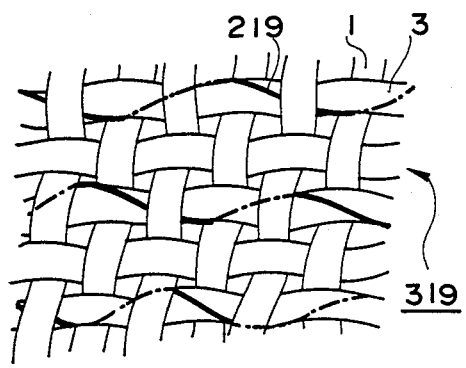
Figure 34:
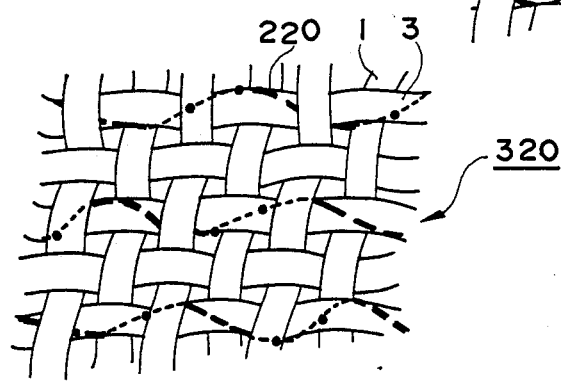
Figure 35:
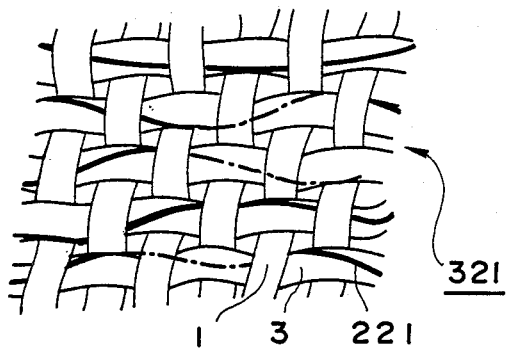
Figure 36:
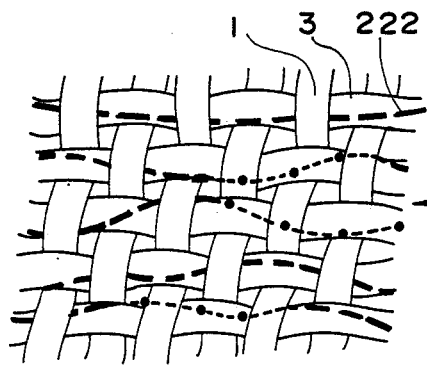
Figure 37:
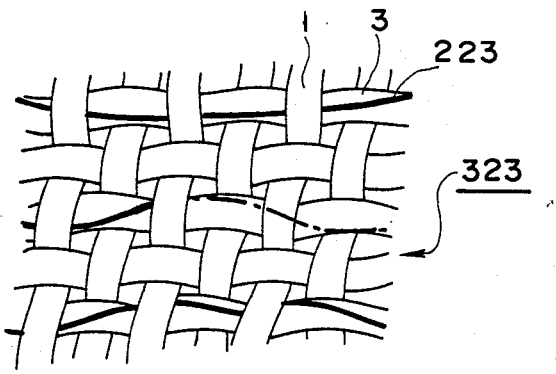
Figure 38:
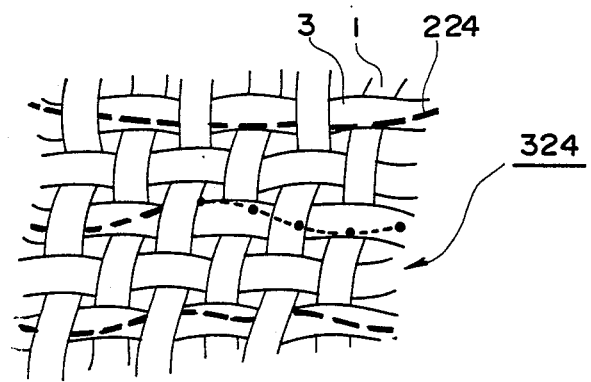
Figure 39:
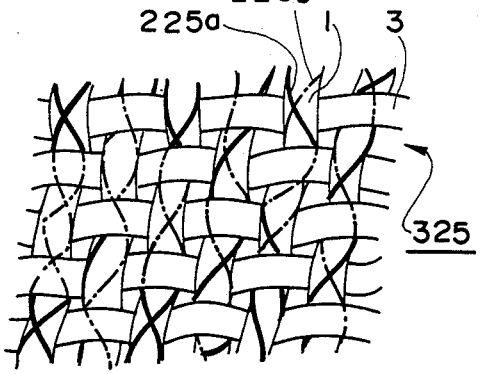
Figure 40:
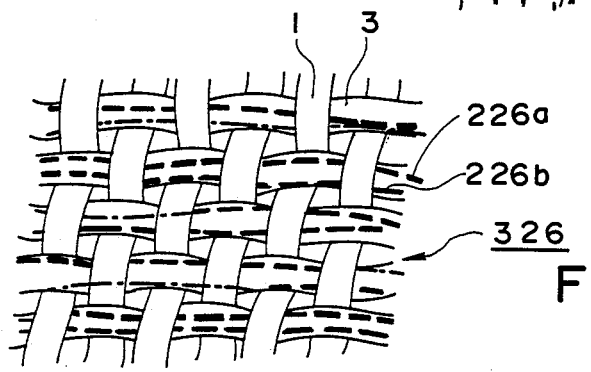
Figure 41:
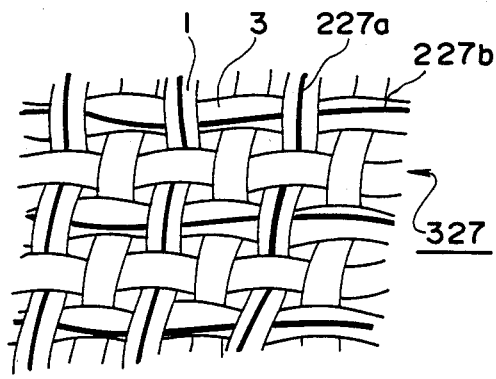

FIG. 11 illustrates the woven fabric substrate shown in FIG. 1 more schematically. The bonding material 2 extends substantially linearly and the bonding material dispose in the central portions of the warps 1 in the width direction of the warps is situated alternately on the front and back surfaces of successive warps. In a substrate 301 shown in FIG. 12, in comparison with the substrate 4 shown in FIG. 11, bonding material 201 adheres to every second warp. In a substrate 302 shown in FIG. 13, in comparison with the substrate 4 shown in FIG. 11, bonding material 202 extends intermittently and substantially linearly. In a substrate 303 shown in FIG. 14, bonding material 203 extends intermittently and substantially linearly and adheres to every second warp. In a substrate 304 shown in FIG. 15, continuously extending bonding material 204 adheres only to one side of each warp 1. In a substrate 305 shown in FIG. 16, in comparison with the substrate 304 shown in FIG. 15, bonding material 205 adheres to every second warp 1. In a substrate 306 shown in FIG. 17, in comparison with the substrate 304 shown in FIG. 15, bonding material 206 extends intermittently along the warps 1. In a substrate 307 shown in FIG. 18, in comparison with the substrate 305 shown in FIG. 16, bonding material 207 extends intermittently. In a substrate 308 shown in FIG. 19, bonding material 208 extends continuously and substantially linearly along the side portions of the warps 1. FIG. 20 illustrates substantially the same woven fabric substrate as the substrate 6 shown in FIG. 2, but more schematically. In comparison with the substrate 308 shown in FIG. 19, bonding material 5 extends intermittently and substantially linearly. In a substrate 309 shown in FIG. 21, in comparison with the substrate 308 shown in FIG. 19, bonding material 209 adheres to every second warp 1. In a substrate 310 shown in FIG. 22, in comparison with the substrate 309 shown in FIG. 21, bonding material 210 extends intermittently. In a substrate 311 shown in FIG. 23, bonding material 211 extending along each warp 1 has been included in an opposite shed during weaving, so that the wefts are threaded through the bonding material oppositely to the warp to which it is adjacent. In this substrate 311, since the bonding material 211 substantially does not exist at the portions where the warps and the wefts intersect, the warps and wefts are not fixed to each other. Therefore, the draping property of the substrate is very high. FIG. 24 illustrates the woven fabric substrate 10 shown in FIG. 4 more schematically. In comparison with the substrate 311 shown in FIG. 23, bonding material 9 extends intermittently and substantially linearly. In a substrate 312 shown in FIG. 25, in comparison with the substrate 311 shown in FIG. 23, bonding material 212 adheres to every second warp 1. In a substrate 313 shown in FIG. 26, in comparison with the substrate 312 shown in FIG. 25, bonding material 213 extends intermittently. FIG. 27 illustrates more schematically the substrate 8 shown in FIG. 3. Bonding material 7 adheres so as to spirally wind around the warps 1 and extends continuously. In a substrate 314 shown in FIG. 28, in comparison with the substrate 8 shown in FIG. 27, bonding material 214 extends intermittently. In a substrate 315 shown in FIG. 29, in comparison with the substrate 8 shown in FIG. 27, bonding material 215 adheres to every second warp 1. In a substrate 316 shown in FIG. 30, in comparison with the substrate 315 shown in FIG. 29, bonding material 216 extends intermittently. In a substrate 317 shown in FIG. 31, bonding material 217 adheres to the wefts 3 so as to spirally wind around and extend continuously along the wefts. In a substrate 318 shown in FIG. 32, in comparison with the substrate 317 shown in FIG. 31, bonding material 218 extends intermittently. In a substrate 319 shown in FIG. 33, in comparison with the substrate 317 shown in FIG. 31, bonding material 219 adheres to every second weft 3. In a substrate 320 shown in FIG. 34, in comparison with the substrate 319 shown in FIG. 33, bonding material 220 extends intermittently. In a substrate 321 shown in FIG. 35, bonding material 221 extends along the wefts 3 in random positions relative thereto, and extends continuously and substantially linearly. In this substrate, the bonding material adheres to the back sides of he wefts where applicable. In a substrate 322 shown in FIG. 36, in comparison with the substrate 321 shown in FIG. 35, bonding material 222 extends intermittently. In a substrate 323 shown in FIG. 37, in comparison with the substrate 321 shown in FIG. 35, bonding material 223 adheres to every second weft 3. In a substrate 324 shown in FIG. 38, in comparison with the substrate 323 shown in FIG. 37, bonding material 224 extends intermittently. In a substrate 325 shown in FIG. 39, two bonding materials 225a and 225b adhere per warp 1 so as to spirally wind around the warp. The winding directions of the bonding materials 225a and 225b are preferably different from each other. In a substrate 326 shown in FIG. 40, two bonding materials 226a and 226b adhere per weft 3 so as to extend along the weft in random positions relative thereto. The bonding materials 226a and 226b extend intermittently and substantially linearly and the bonding material adheres to the back sides of the wefts where applicable. In a substrate 327 shown in FIG. 41, bonding materials 227a and 227b extend along the warps 1 and the wefts 3 respectively. In this embodiment, the bonding materials 227a and 227b adhere to every second warp 1 and every second weft 3 respectively.

Thus, bonding materials can pre-adhere to a woven fabric substrate composed of a plain weave fabric in various ways.

Next, FIGS. 42–51 show embodiments in accordance with a biased plain weave fabric.

Figure 42:
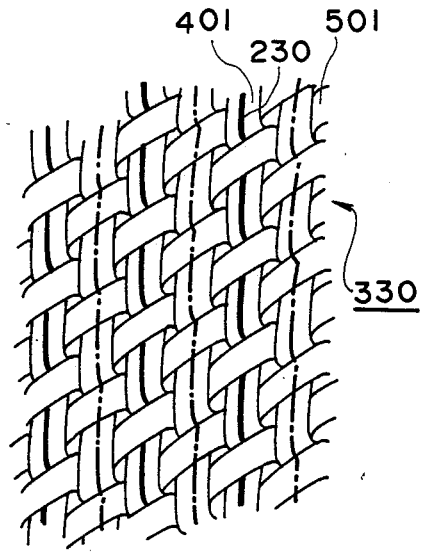
FIGS. 42–51 are schematic plan views of woven fabric substrates, showing various adhesive states of bonding materials in accordance with a woven fabric substrate having a biased plain weave structure according to the present invention.
Figure 43:
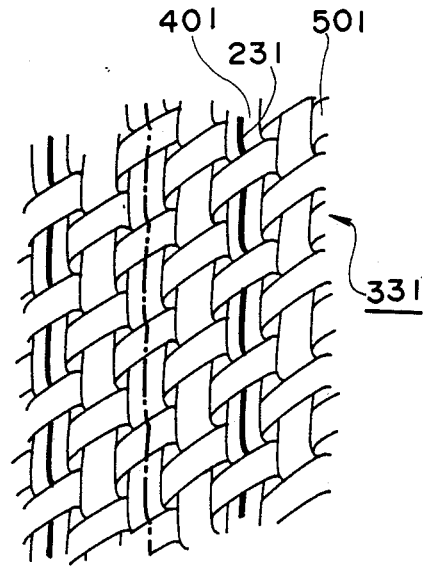
Figure 44:
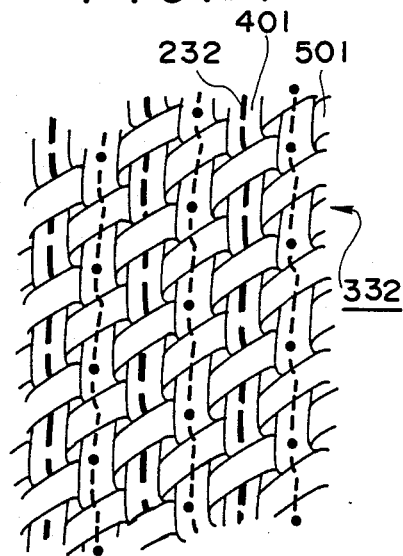
Figure 45:
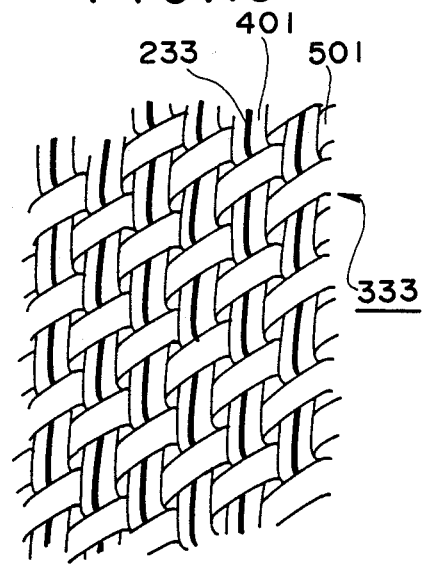
Figure 46:
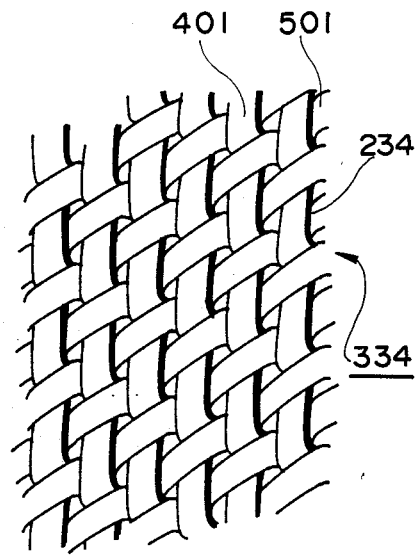
Figure 47:
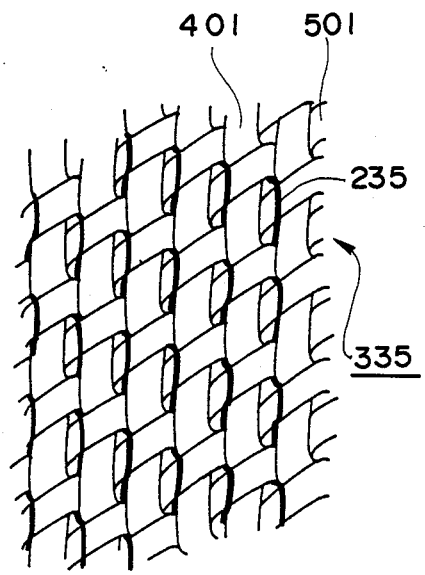
Figure 48:
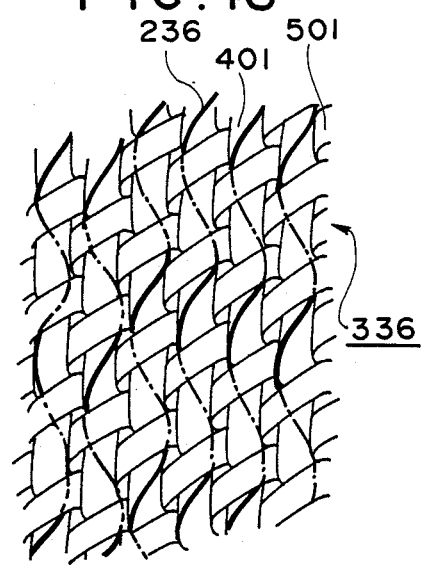
Figure 49:
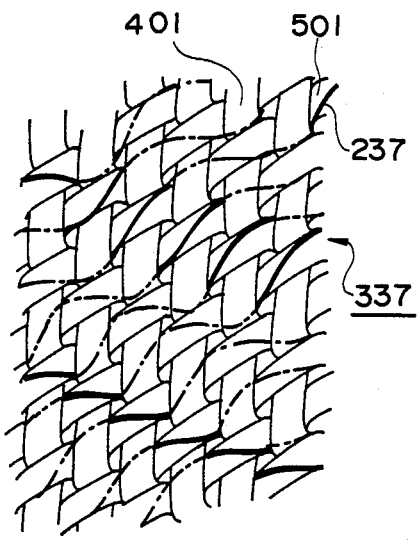
Figure 50:
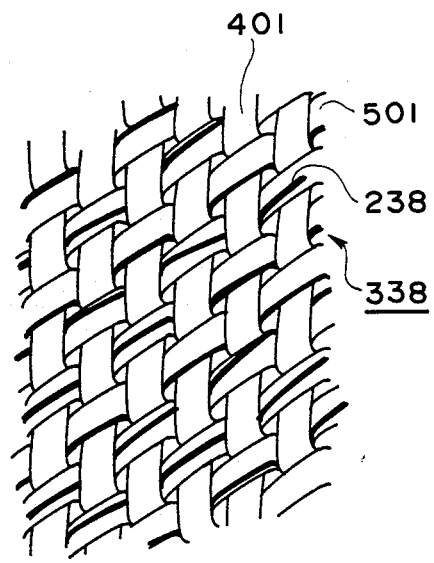
Figure 51:
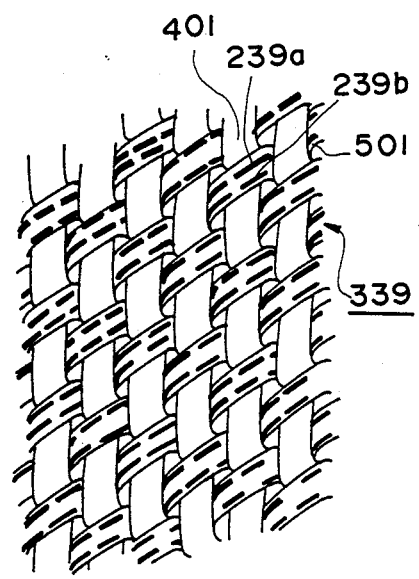

FIG. 42 illustrates a woven fabric substrate 330 having a biased plain weave structure wherein warps 401 and wefts 501 are composed of multifilaments of reinforcing fibers and the wefts are biased so as to make an angle of 45° relative to the warps. The angle of intersection between the warps and wefts can be appropriately chosen from within the range −90° to +90°. In this substrate 330, bonding material 230 adheres to the central portions of the warps 401 in the width direction thereof and is situated alternately on the front and back surfaces of successive warps, and the bonding material extends continuously and substantially linearly. In a substrate 331 shown in FIG. 43, in comparison with the substrate 330 shown in FIG. 42, bonding material 231 adheres to every second warp 401. In a substrate 332 shown in FIG. 44, in comparison with the substrate 330 shown in FIG. 42, bonding material 232 extends intermittently. In a substrate 333 shown in FIG. 45, bonding material 233 adheres only to one side of each warp 401. In a substrate 334 shown in FIG. 46, bonding material 234 extends continuously along the side portions of the warps 401. In a substrate 335 shown in FIG. 47, bonding material 235 extends continuously along the warps 401 in a direction opposite to the direction in which the warps are threaded through the wefts 501. In a substrate 336 shown in FIG. 48, bonding material 236 extends continuously along the warps 401 so as to spirally wind around the warps. In a substrate 337 shown in FIG. 49, bonding material 237 extends continuously along the wefts 501 so as to spirally wind around the wefts. In a substrate 338 shown in FIG. 50, bonding material 238 extends continuously along the wefts 501 in random positions relative thereto. In a substrate 339 shown in FIG. 51, two bonding materials 239a and 239b adhere per weft 501 so as to extend intermittently along the weft in random positions relative thereto. In the substrates 338 and 339 shown in FIGS. 50 and 51, bonding material adheres to the back sides of the wefts where applicable. In the above embodiments, bonding material may extend intermittently and may be situated on every second warp or weft.

Next, FIGS. 52-57 show the embodiments in accordance with a unidirectional biased plain weave fabric.

Figure 52:
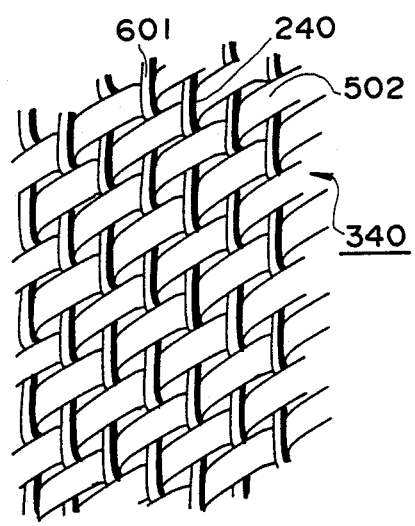
FIGS. 52–57 are schematic plan views of woven fabric substrates, showing various adhesive states of bonding materials in accordance with a woven fabric substrate having a unidirectional biased plain weave structure according to the present invention.
Figure 53:
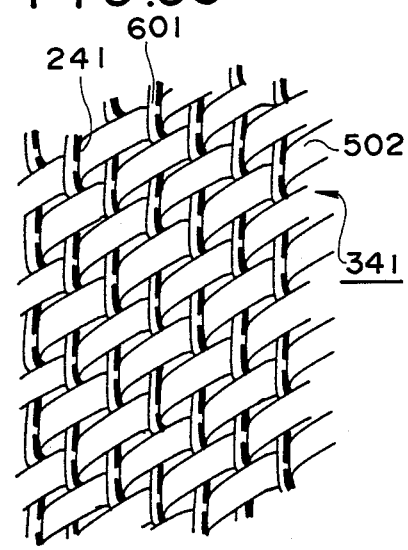
Figure 54:
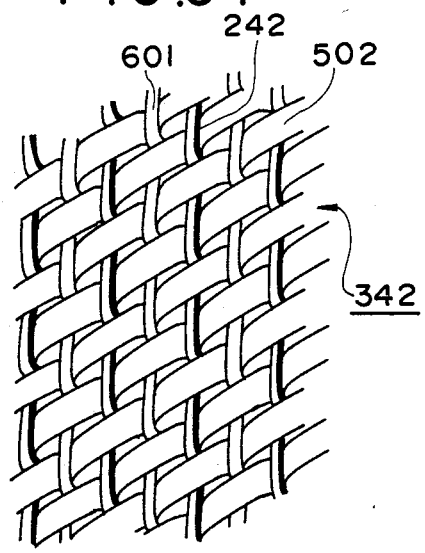
Figure 55:
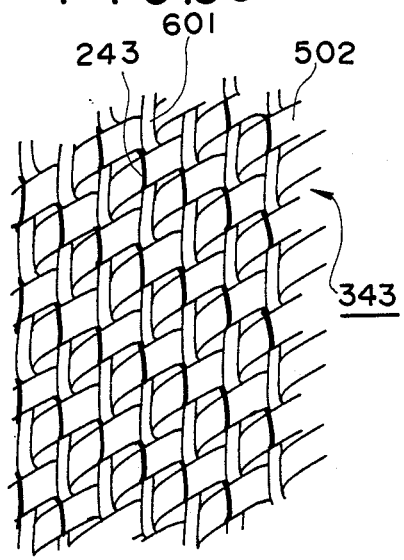
Figure 56:
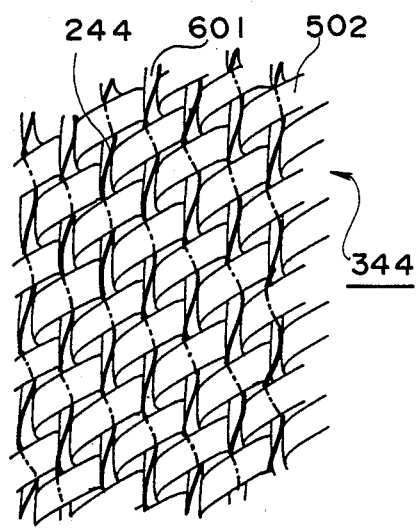
Figure 57:
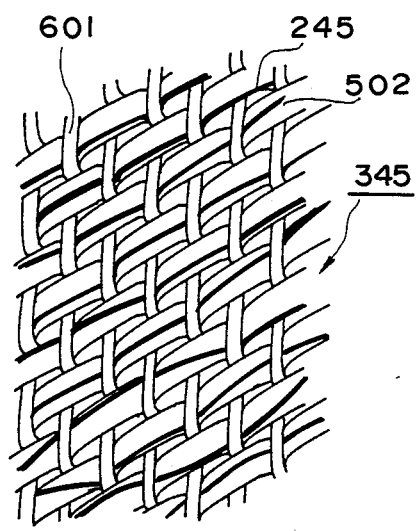

FIG. 52 illustrates a unidirectional biased plain weave fabric 340 which comprises wefts 502 composed of reinforcing fibers and auxiliary filamentary yarns 601 as warps. The wefts 502 extend in one direction and are biased by 45° relative to the auxiliary filamentary yarns 601. In this substrate 340, bonding material 240 extends continuously along the auxiliary filamentary yarns 601. In a substrate 341 shown in FIG. 53, in comparison with the substrate 340 shown in FIG. 52, bonding material 241 extends intermittently and substantially linearly. In a substrate 342 shown in FIG. 54, in comparison with the substrate 340 shown in FIG. 52, bonding material 242 is situated on every second auxiliary filamentary yarn 601. In a substrate 343 shown in FIG. 55, bonding material 243 extends continuously along the auxiliary filamentary yarns 601 in a direction opposite to the direction in which the auxiliary filamentary yarns are threaded through the wefts 502. In a substrate 344 shown in FIG. 56, bonding material 244 extends continuously along the auxiliary filamentary yarns 601 so as to spirally wind around the auxiliary filamentary yarns. In the above embodiments bonding material may extend intermittently and may be situated on every second auxiliary filamentary yarn. In a substrate 345 shown in FIG. 57, bonding material 245 adheres to the wefts 502 in random positions relative thereto and extends continuously along the wefts.

Next, FIGS. 58-67 show the embodiments in accordance with a twill weave fabric.

Figure 58:
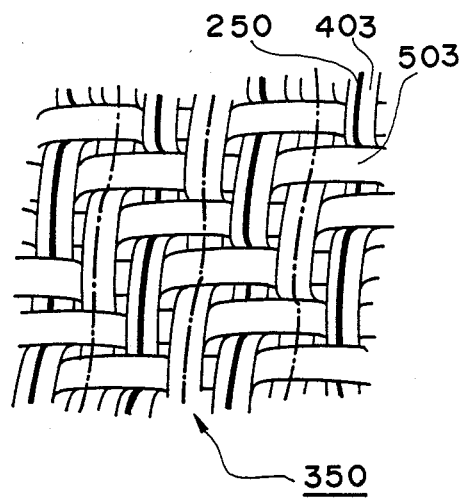
FIGS. 58–67 are schematic plan views of woven fabric substrates, showing various adhesive states of bonding materials in accordance with a woven fabric substrate having a twill weave structure according to the present invention.
Figure 59:
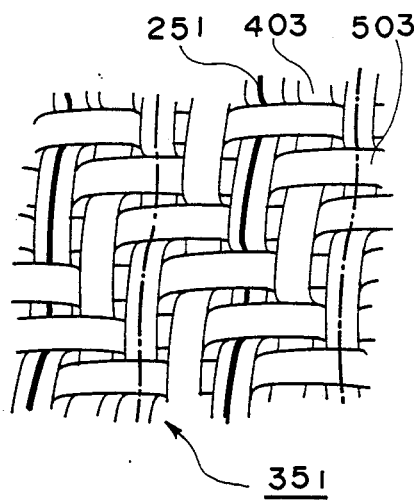
Figure 60:
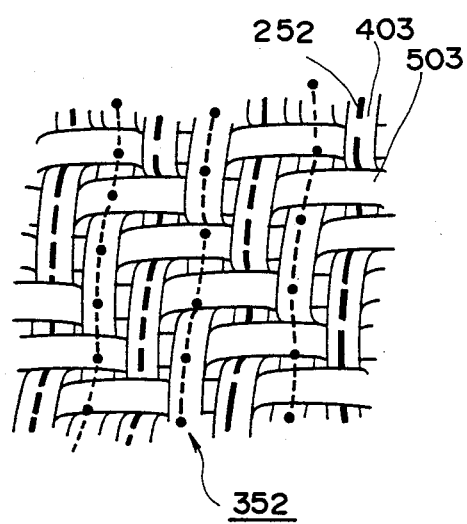
Figure 61:
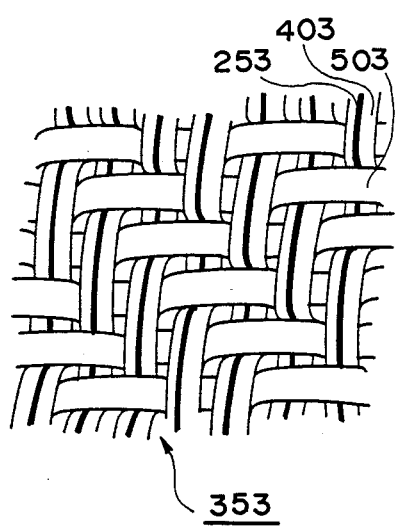
Figure 62:
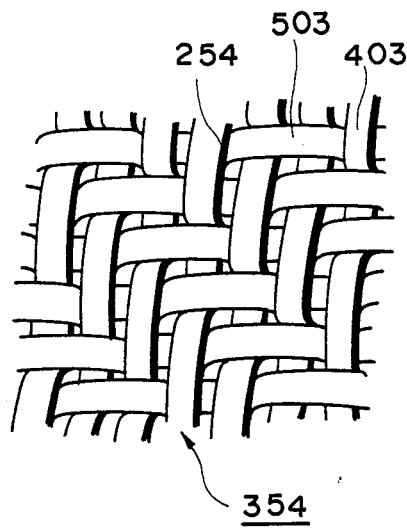
Figure 63:
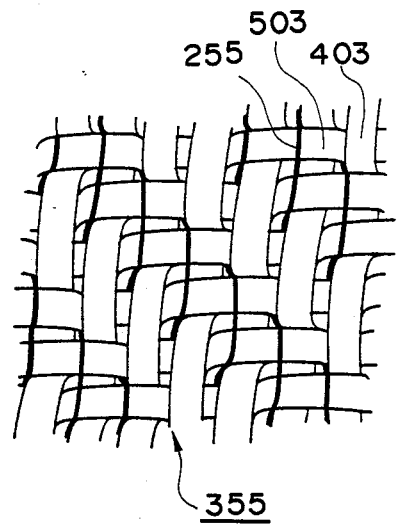
Figure 64:
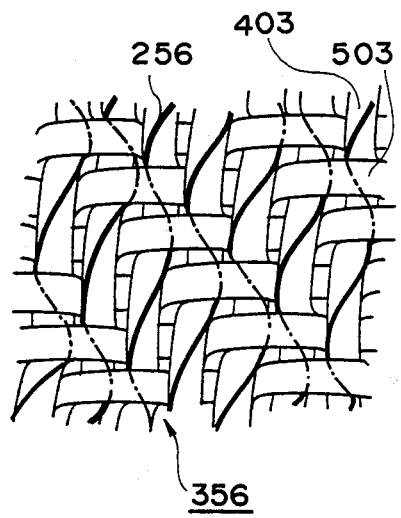
Figure 65:
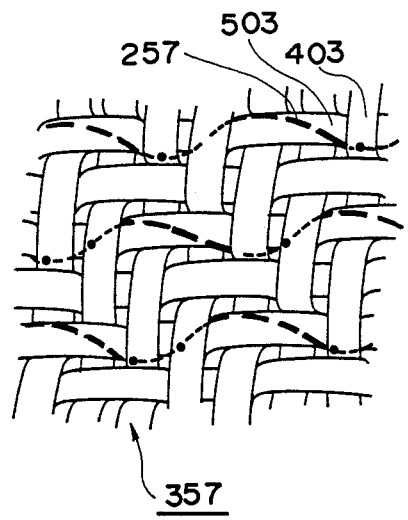
Figure 66:
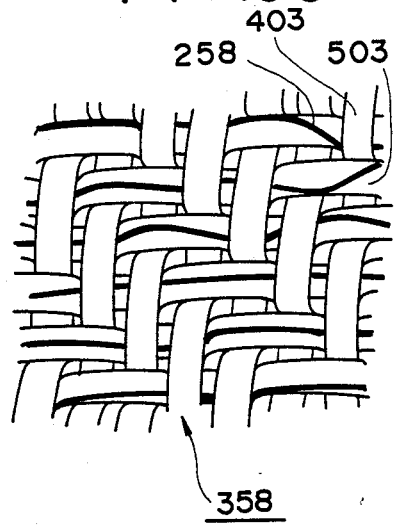
Figure 67:
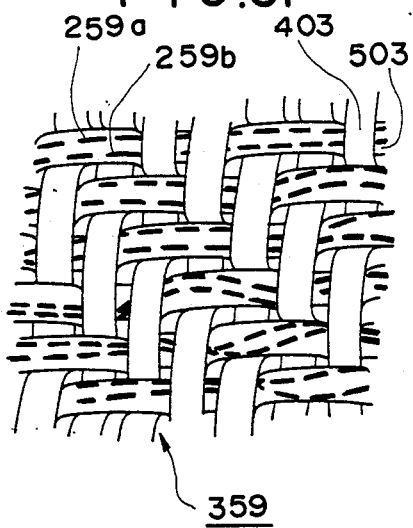

FIG. 58 illustrates a twill weave fabric wherein warps 403 and wefts 503 intersect at right angles and at intervals of two yarns. In this substrate 350, bonding material 250 adheres to the central portions of the warps 403 in the width direction thereof and is situated alternately on the front and back surfaces of each warp, and extends continuously along the warps. In a substrate 351 shown in FIG. 59, in comparison with the substrate 350 shown in FIG. 58, bonding material 251 is situated on every second warp 403. In a substrate 352 shown in FIG. 60, in comparison with the substrate 350 shown in FIG. 58, bonding material 252 extends intermittently. In a substrate 353 shown in FIG. 61, bonding material 253 adheres only to one side of each warp 403. In a substrate 354 shown in FIG. 62, bonding material 254 extends continuously along the side portions of the warps 403. In a substrate 355 shown in FIG. 63, bonding material 255 extends continuously along the warps 403 in a direction opposite to the direction in which the warps are threaded through the wefts 503. In a substrate 356 shown in FIG. 64, bonding material 256 extends continuously along the warps 403 so as to spirally wind around the warps. In a substrate 357 shown in FIG. 65, bonding material 257 extends intermittently along the wefts 503 so as to spirally wind around the wefts and the bonding material is situated on every second weft. In a substrate 358 shown in FIG. 66, bonding material 258 extends continuously along the wefts 503 in random positions relative thereto. In a substrate 359 shown in FIG. 67, two bonding materials 259a and 259b adhere per weft 503 so as to extend intermittently along the weft in random positions relative thereto. In the substrates 358 and 359 shown in FIGS. 66 and 67, bonding material adheres to the back sides of the wefts where applicable. In the above embodiments, bonding material may extend continuously or intermittently and may be situated on every second weft or warp.

Next, FIGS. 68-77 show the embodiments in accordance with a satin weave fabric.

Figure 68:
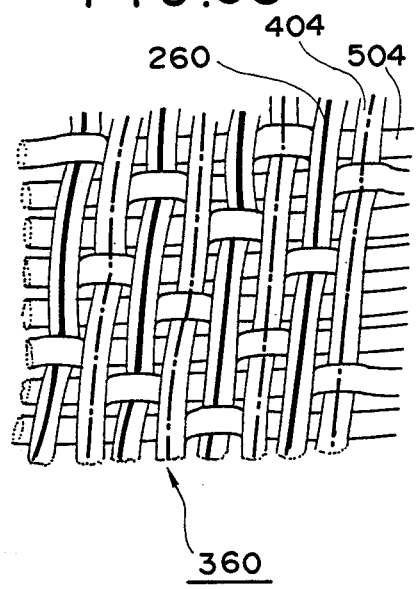
FIGS. 68–77 are schematic plan views of woven fabric substrates, showing various adhesive states of bonding materials in accordance with a woven fabric substrate having a satin weave structure according to the present invention.
Figure 69:
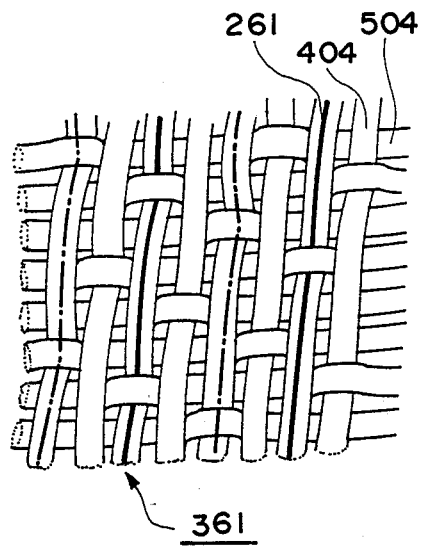
Figure 70:
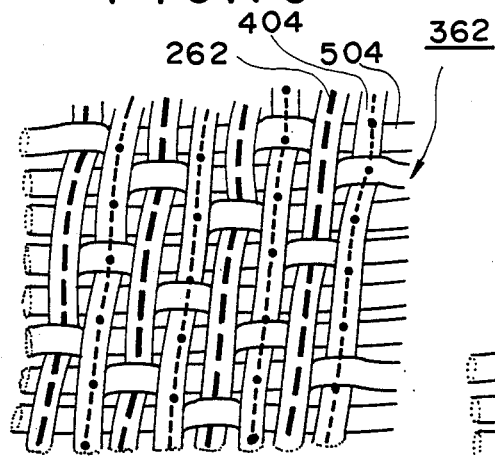
Figure 71:
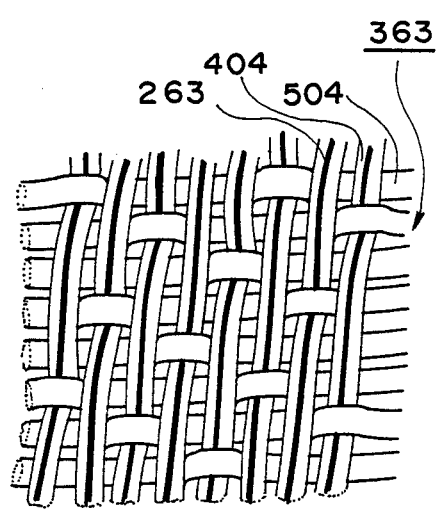
Figure 72:
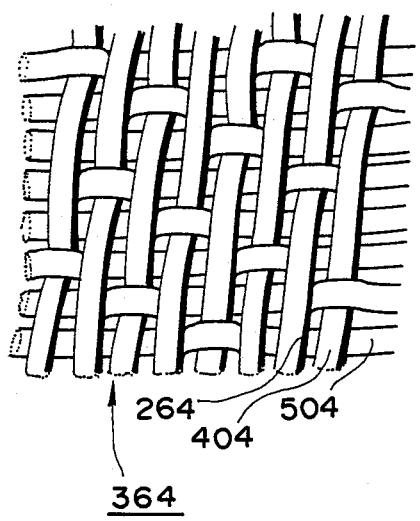
Figure 73:
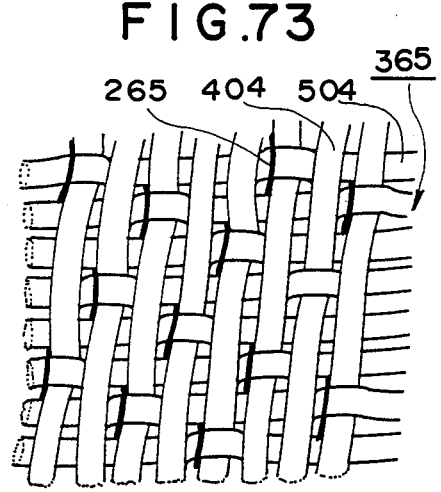
Figure 74:
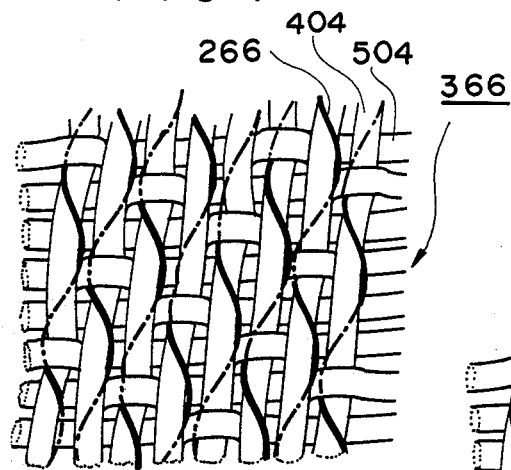
Figure 75:
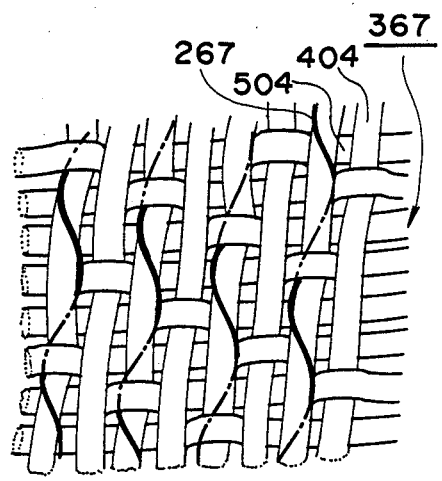
Figure 76:
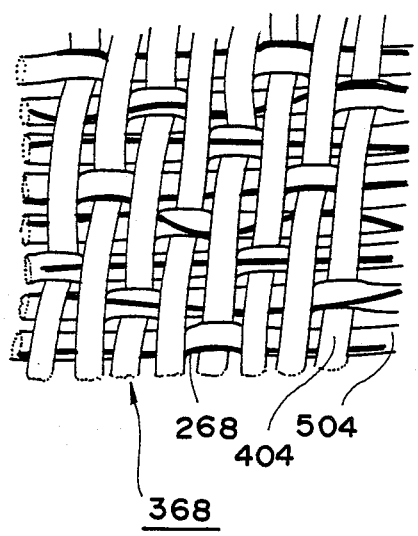
Figure 77:
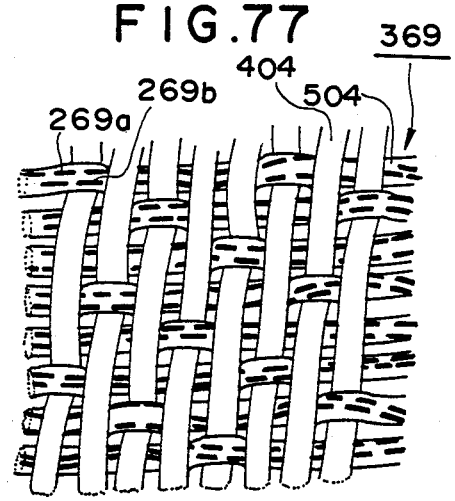

FIG. 68 illustrates a satin weave fabric wherein warps 404 and wefts 504 intersect each other at right angles, a warp or a weft is threaded firstly on one side of the fabric over four wefts or warps and is then threaded over one weft or warp on the other side. In this substrate 360, bonding material 260 adheres to the central portions of the warps 404 in the width direction of the warps and is situated alternately on the front and back surfaces of each warp, and extends continuously along the warps. In a substrate 361 shown in FIG. 69, in comparison with the substrate 360 shown in FIG. 68, bonding material 261 is situated on every second warp 404. In a substrate 362 shown in FIG. 70, in comparison with the substrate 360 shown in FIG. 68, bonding material 262 extends intermittently. In a substrate 363 shown in FIG. 71, bonding material 263 adheres only to one side of each warp 404. In a substrate 364 shown in FIG. 72, bonding material 264 extends continuously along the side portions of the warps 404. In a substrate 365 shown in FIG. 73, bonding material 265 extends continuously along the warps 404 in a direction opposite to the direction in which the warps are threaded through the wefts 504. In a substrate 366 shown in FIG. 74, bonding material 266 extends continuously along the warps 404 so as to spirally wind around the warps. In a substrate 367 shown in FIG. 75, bonding material 267 extends intermittently along the warps 404 so as to spirally wind around the warps and the bonding material is situated on every second warp. In a substrate 368 shown in FIG. 76, bonding material 268 extends continuously along the wefts 504 in random positions relative thereto. In a substrate 369 shown in FIG. 77, two bonding materials 269a and 269b adhere per weft 504 so as to extend intermittently along the weft in random positions relative thereto. In the substrates 368 and 369 shown in FIGS. 76 and 77, bonding material adheres to the back sides of the wefts where applicable. In the above embodiments, bonding material may extend continuously or intermittently and may be situated on every second weft or warp.

Next, FIGS. 78-85 show the embodiments in accordance with a woven fabric substrate having a non-crimp fibrous structure.

FIG. 78 illustrates a so called non-crimp woven fabric, which comprises (a) a yarn group (A) 701a composed of a plurality of straight reinforcing yarns gathered in one direction parallel to one another in the form of a sheet, (b) a yarn group (B) 701b composed of a plurality of straight reinforcing yarns gathered in one direction parallel to one another in the form of a sheet, the sheet face of the yarn group B contacting the sheet face of the yarn group A and the reinforcing yarns of yarn group B intersecting the reinforcing yarns of yarn group A, and (c) auxiliary filamentary yarns 602a and 602b which integrally hold the yarn groups A and B so as to form the woven fabric. In this substrate 370, bonding material 270 extends continuously along auxiliary filamentary yarns 602b. In a substrate 371 shown in FIG. 79, in comparison with the substrate 370 shown in FIG. 78, bonding material 271 extends intermittently. In a substrate 372 shown in FIG. 80, in comparison with the substrate 370 shown in FIG. 78, bonding material 272 is situated on every second auxiliary filamentary yarn 602b. In a substrate 373 shown in FIG. 81, bonding material 273 adheres to the side portions of the groups of reinforcing yarns 405 defined by the auxiliary filamentary yarns 602b and extends continuously along the reinforcing yarns. In a substrate 374 shown in FIG. 82, in comparison with the substrate 373 shown in FIG. 81, bonding material 274 extends intermittently. In a substrate 375 shown in FIG. 83, bonding material 275 adheres to the auxiliary filamentary yarns 602b so as to spirally wind around the auxiliary filamentary yarns, and extends continuously along the auxiliary filamentary yarns. In a substrate 376 shown in FIG. 84, bonding material 276 extends continuously along the auxiliary filamentary yarns 602a in random positions relative thereto. The bonding material 276 adheres also to the back sides of the auxiliary filamentary yarns 602a, where applicable. In a substrate 377 shown in FIG. 85, bonding material 277 adheres to the auxiliary filamentary yarns 602a and extends continuously along the auxiliary filamentary yarns. In the above embodiments, bonding materials may extend continuously or intermittently and may be situated on every second yarn or every second group in accordance with the auxiliary filamentary yarns 602a or 602b, or the groups of reinforcing yarns defined by the auxiliary filamentary yarns.

Figure 86:
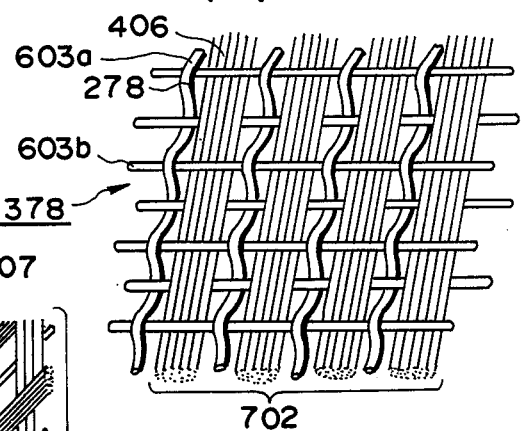

With respect to a non-crimp woven fabric, as illustrated in FIG. 86, a woven fabric having reinforcing yarns gathered only in one direction may be employed in the present invention. Thus, the woven fabric comprises (a) a yarn group 702, composed of a plurality of straight reinforcing yarns 406 gathered in one direction parallel to one another in the form of a sheet and (b) first auxiliary filamentary yarns 603a arranged intermediately between every two adjacent reinforcing yarn groups and extending in a direction parallel to the reinforcing yarns and second auxiliary filamentary yarns 603b intersecting the reinforcing yarns, the first and second auxiliary filamentary yarns cooperatively holding the yarn group so as to form the woven fabric. In this substrate 378, bonding material 278 extends continuously along the auxiliary filamentary yarns 603a. Also in this unidirectional non-crimp woven fabric, various embodiments similar to the embodiments shown in FIGS. 79-85 can be carried out.

Next, FIGS. 87-93 show the embodiments in accordance with a biased non-crimp woven fabric. An angle α between two yarn groups composed of reinforcing yarns gathered in two directions different from each other can be appropriately chosen from within the range −90° to +90°. FIGS. 87-93 show a biased non-crimp woven fabric wherein α equals +45°, as an example.

Figure 87:
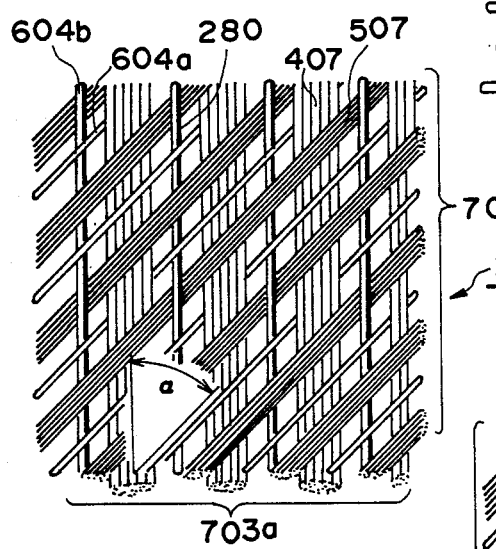
FIGS. 87–93 are schematic plan views of woven fabric substrates, showing various adhesive states of bonding materials in accordance with a woven fabric substrate having a biased non-crimp fibrous structure according to the present invention.
Figure 88:
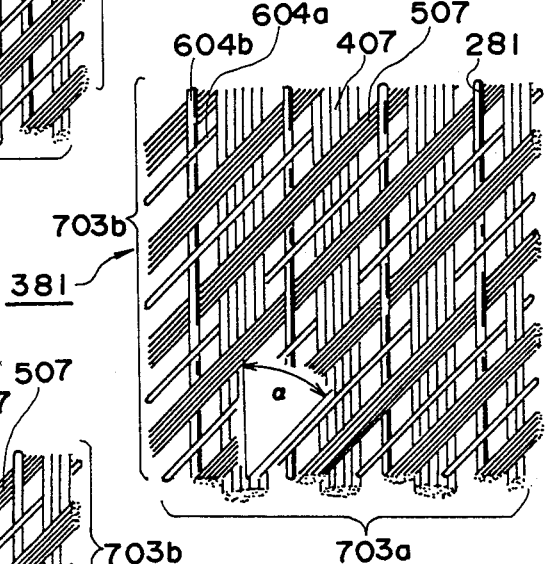
Figure 89:
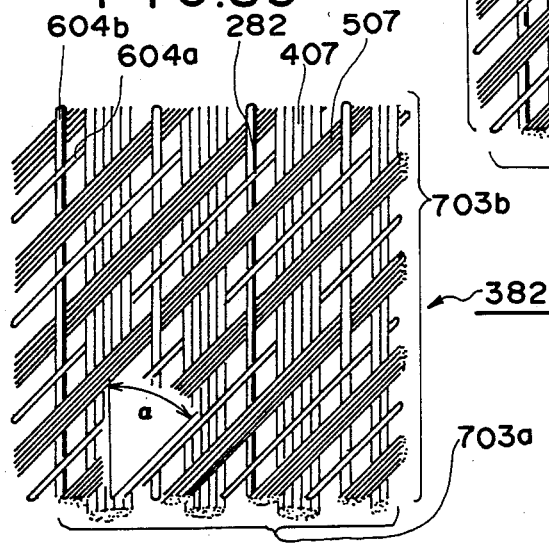
Figure 90:
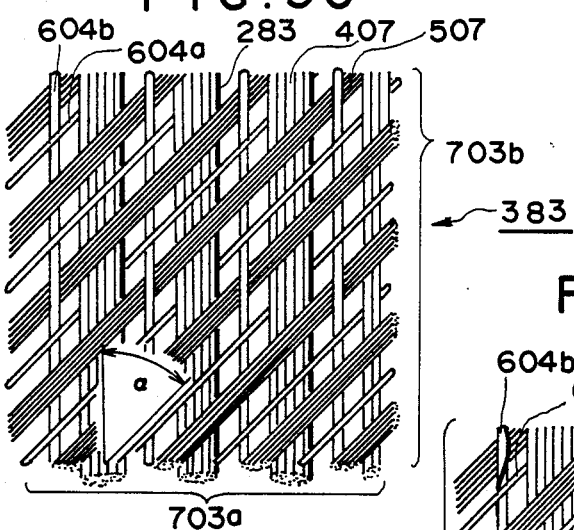
Figure 91:
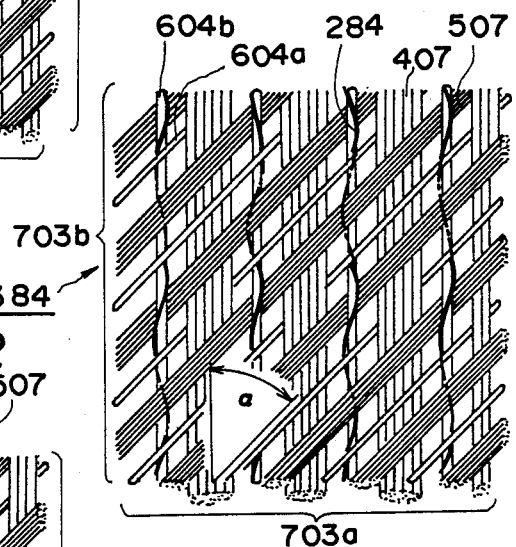
Figure 92:
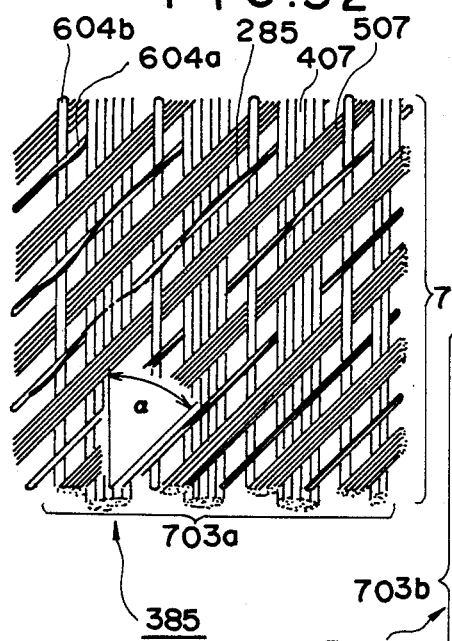
Figure 93:
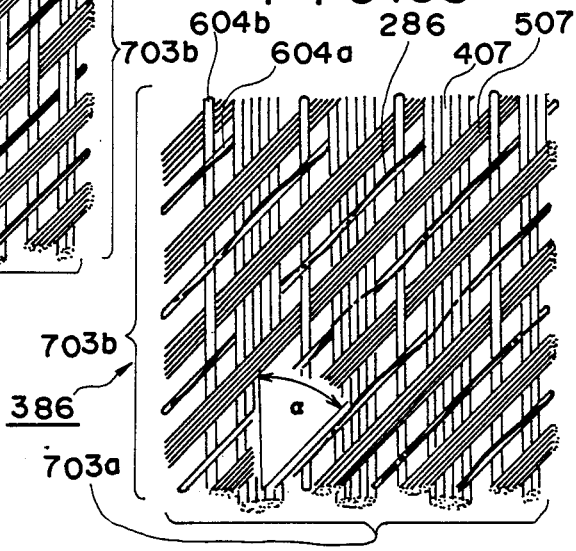

In a substrate 380 shown in FIG. 87, two yarn groups 703a and 703b composed of reinforcing yarns 407 and 507 gathered in two different directions in the form of a sheet, are integrally held by auxiliary filamentary yarns 604a and 604b, and bonding material 280 extends continuously along the auxiliary filamentary yarns 604b. In a substrate 381 shown in FIG. 88, in comparison with the substrate 380 shown in FIG. 87, bonding material 281 extends intermittently. In a substrate 382 shown in FIG. 89, in comparison with the substrate 380 shown in FIG. 87, bonding material 282 is situated on every second auxiliary filamentary yarn 604b. In a substrate 383 shown in FIG. 90, bonding material 283 adheres to the side portions of the groups of reinforcing yarns 407 defined by the auxiliary filamentary yarns 604b and extends continuously along the reinforcing yarns 407. In a substrate 384 shown in FIG. 91, bonding material 284 adheres to the auxiliary filamentary yarns 604b so as to spirally wind around the auxiliary filamentary yarns and extends continuously along the auxiliary filamentary yarns. In a substrate 385 shown in FIG. 92, bonding material 285 adheres to the auxiliary filamentary yarns 604a in random positions relative thereto and extends continuously along the auxiliary filamentary yarns. The bonding material 285 adheres also to the back sides of the auxiliary filamentary yarns 604a where applicable. In a substrate 386 shown in FIG. 93, bonding material 286 adheres to the auxiliary filamentary yarns 604a so as to spirally wind around the auxiliary filamentary yarns and extends continuously along the auxiliary filamentary yarns. In the above embodiments, bonding material may extend continuously or intermittently and may be situated on every second yarn or every second group in accordance with the auxiliary filamentary yarns 602a or 602b, or the groups of reinforcing yarns defined by the auxiliary filamentary yarns In such non-crimp woven fabrics as shown in FIGS. 78-93, the function of auxiliary filamentary yarns is to integrally hold groups of reinforcing yarns extending in one or two directions and to provide a substrate with a certain shape. The elongation at break of auxiliary filamentary yarns is preferably greater than that of reinforcing yarns. Since properties of FRP such as strength and elastic modulus become larger in proportion to the increase in the volume of reinforcing fibers, it is desirable to reduce the cross sectional area of an auxiliary filamentary yarn to as small as possible and to increase the amount of reinforcing fibers per unit volume of FRP to as large as possible The ratio of auxiliary filamentary yarns to reinforcing yarns in accordance with cross sectional area of yarns in a woven fabric substrate is preferably from 0.01 to 0.20. When reinforcing yarns or reinforcing yarns and auxiliary filamentary yarns are bonded by heating a bonding material composed of a thermoplastic polymer, the auxiliary filamentary yarns tend to shrink, whereas the reinforcing yarns virtually do not shrink. The large shrinkage of the auxiliary filamentary yarns is undesirable because snaking of the reinforcing yarns occurs, thereby decreasing the strength and elastic modulus of the FRP. To prevent the snaking of reinforcing yarns, the rate of thermal shrinkage of auxiliary filamentary yarns must not be greater than 2% under dry conditions at 150° C. As fibers for the auxiliary filamentary yarns satisfying the above requirements, for example, for a substrate comprising reinforcing yarns of carbon fibers, there can be used glass fibers and polyaramide fibers having an elongation at break larger than that of carbon fibers, or can be used carbon fibers having an elongation at break larger than that of the carbon fibers constituting the reinforcing yarns.

Next, in FIGS. 94-107, typical methods for manufacturing woven fabric substrates according to the present invention are explained, in accordance with the woven fabric substrates shown in FIGS. 1-4.

First, the manufacturing method for the woven fabric substrate shown in FIG. 1 is explained.

Figure 94:
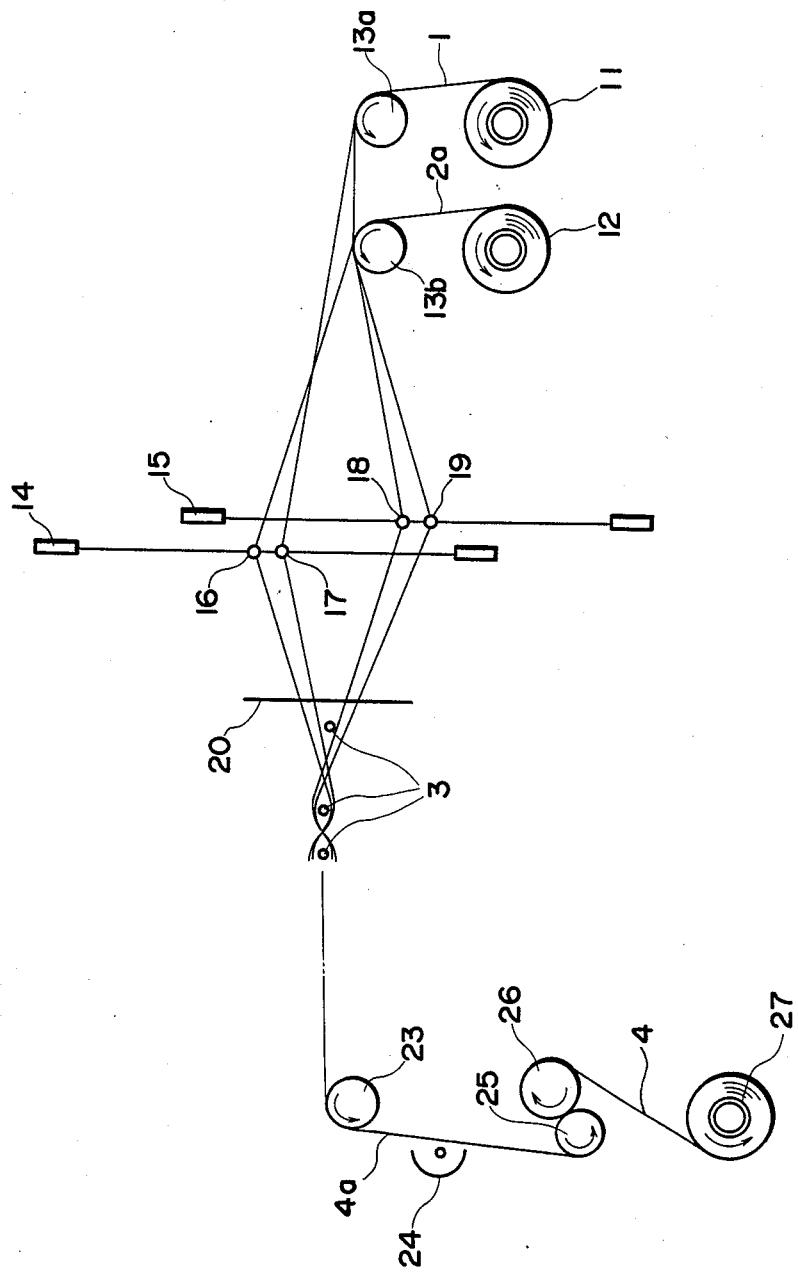
FIGS. 94–97 are schematic views illustrating the weaving of the woven fabric substrate shown in FIG. 1, FIG. 94 being a side view, FIG. 95 being a perspective view, FIG. 96 being a side view and FIG. 97 being a side view.
Figure 95:
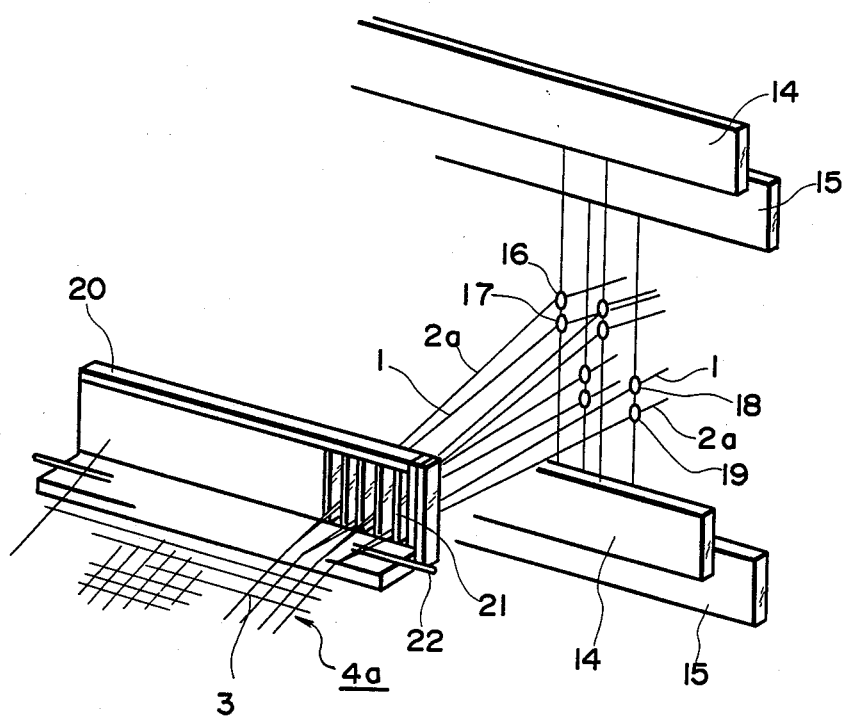

In FIG. 94, warps 1 composed of reinforcing fibers are drawn from packages 11 (there being the same number as the number of warps) and thermoplastic polymer yarns 2a are drawn from packages 12 (there being the same number as the number of warps). Each of the yarns 1 and 2a, after passing around guide rollers 13a and 13b, is passed through upper and lower mails 16, 17, 18 and 19 of healds 14 and 15. The thermoplastic polymer yarns 2a are passed through the upper mail 16 of the heald 14 and the lower mail 19 of the heald 15 and the warps 1 are passed through the lower mail 17 of the heald 14 and the upper mail 18 of the heald 15 in reality, the pair of mails 16 and 17 and the pair 18 and 19 are both arranged in a direction perpendicular to the surface of the paper showing FIG. 94, so as to prevent them from interfering with each other. Thus, as shown in FIG. 95, the warp 1 and the thermoplastic polymer yarn 2a passed through the mails 16 and 17 attached to the same wire of the heald 14 are set as one unit, and the unit is passed through one reed 21 of a reed plate 20. Through the next reed 21, the next unit of warp 1 and thermoplastic polymer yarn 2a passed through the mails 18 and 19 attached to the same wire of the heald 15 is passed. This procedure is repeated Many warps 1 and thermoplastic polymer yarns 2a, similarly attached to healds 14 and 15, are arranged in respective sheets, and when the sheets open a to form a shed, wefts 3 composed of reinforcing fibers are inserted into the shed between the sheets using a rapier 22 or a shuttle (not shown). By the repetition of the above operation a woven fabric 4a is obtained, and as shown in FIG. 94, the woven fabric 4a is heated by a heater 24 after being passed around a guide roller 23. The thermoplastic polymer yarns 2a are softened or melted by the heating, after which the woven fabric 4a is lightly pressed between a pair of rollers 25 and 26, and thus a woven fabric substrate 4 according to the present invention is obtained The obtained substrate 4 is wound onto a winding roller 27.

Figure 96:
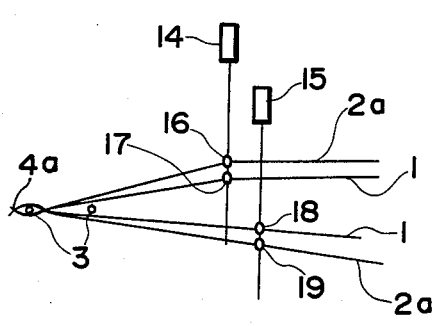
Figure 97:
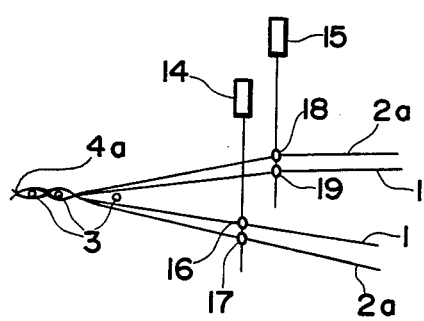

In the above process, the motions of warps 1 and thermoplastic polymer yarns 2a and the insertion of the wefts 3 are performed as shown in FIGS. 96 and 97.

In FIG. 96, the heald 14 is lifted, the heald 15 is brought down, and the weft 3 is inserted by the rapier 22 (FIG. 95) into the shed between the sheet formed by the yarns passed through the heald 14 and the sheet formed by the yarns passed through the heald 15. Next, as shown in FIG. 97, the heald 14 is brought down, the heald 15 is lifted, and the next weft 3 is inserted into the shed between the sheets. The actions shown in FIGS. 96 and 97 are repeated, thereby weaving the fabric 4a.

Figure 98:
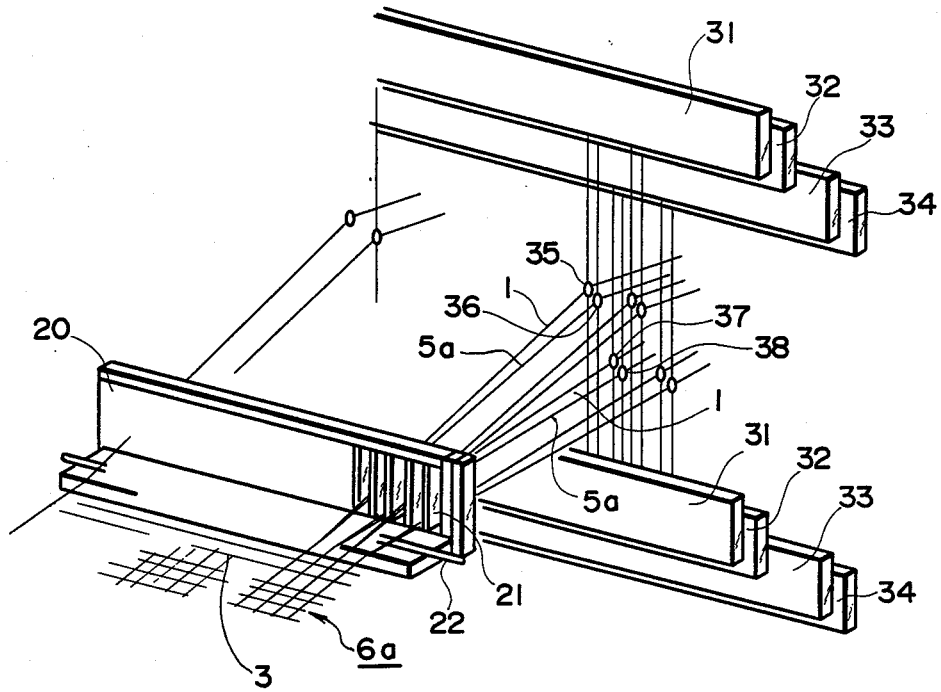
FIGS. 98–100 are schematic views illustrating the weaving of the woven fabric substrate shown in FIG. 2, FIG. 98 being a perspective view, FIG. 99 being a side view and FIG. 100 being a side view.
Figure 99:
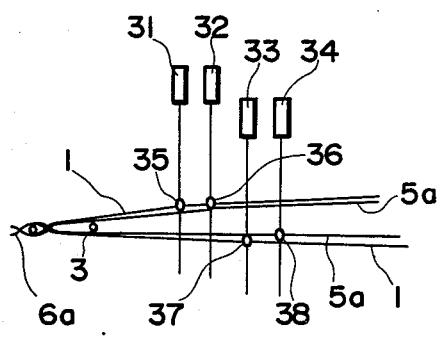
Figure 100:
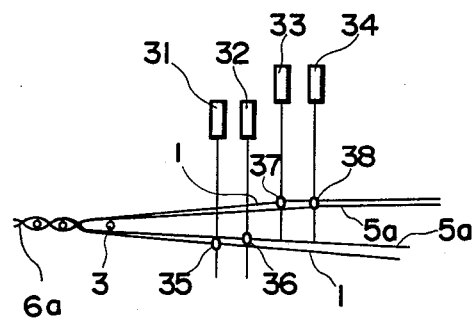
Figure 101:
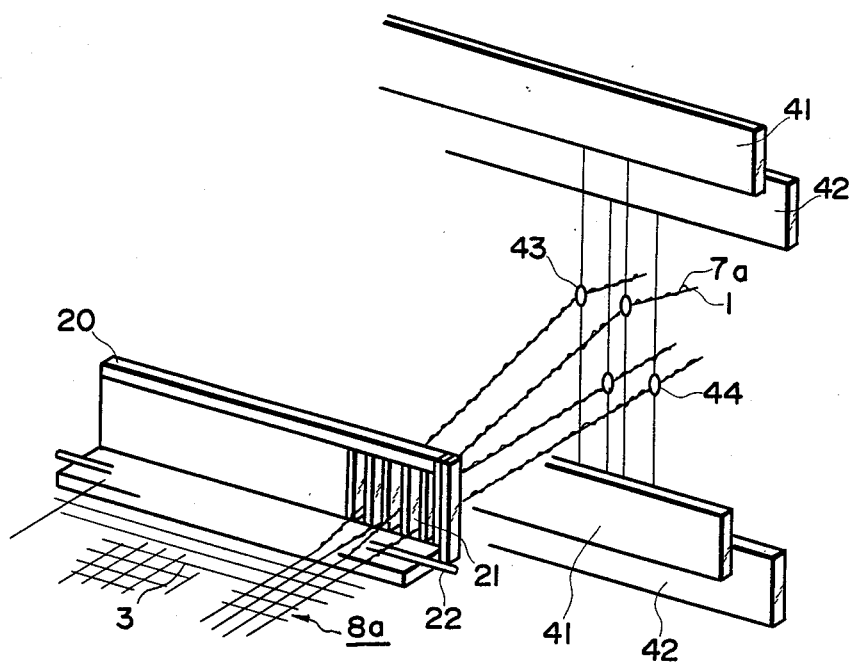
FIGS. 101–104 are schematic views illustrating the weaving of the woven fabric substrate shown in FIG. 3, FIG. 101 being a perspective view, FIG. 102 being a side view, FIG. 103 being a side view and FIG. 104 being a side view.

Next, in FIGS. 98-100, the manufacturing method for the woven fabric substrate 6 shown in FIG. 2 is explained. Since the process after weaving is the same as in FIG. 94, it is omitted from these drawings.

In this process, four healds 31, 32, 33 and 34 are used. Mails 35 and 36 of healds 31 and 32 are at the same height, and similarly mails 37 and 38 of healds 33 and 34 are at the same height. The healds 31 and 32, and similarly the healds 33 and 34, are moved in the same vertical direction. Warps 1 are passed through mails 35 and 37, and thermoplastic polymer yarns 5a are passed through mails 36 and 38. The mails 35, 36, 37 and 38 are arranged repeatedly in this order in the width direction of the woven fabric 6a. The warp 1 passed through mail 35 and the thermoplastic polymer yarn 5a passed through mail 36 adjacent to mail 35 are passed through a same reed 21 of the reed plate 20, and the warp 1 passed through mail 37 and the thermoplastic polymer yarn 5a passed through mail 38 adjacent to mail 37 are passed through a next same reed.

The insertion of wefts 3 is performed as shown in FIGS. 99 and 100. The healds 31 and 32 are lifted, the healds 33 and 34 are brought down, and into the shed formed between the sheets the weft 3 is inserted by the rapier 22 (FIG. 98). The reed plates are then beaten up. Next, as shown in FIG. 100, the healds 31 and 32 are brought down, the healds 33 and 34 are lifted, and next weft 3 is inserted into the shed thus formed. The actions shown in FIGS. 99 and 100 are repeated. Thus a woven fabric 6a is obtained.

Next, in FIGS. 101-104, the manufacturing method for a woven fabric before heat treatment is described in accordance with the woven fabric substrate shown in FIG. 3.

Figure 102:
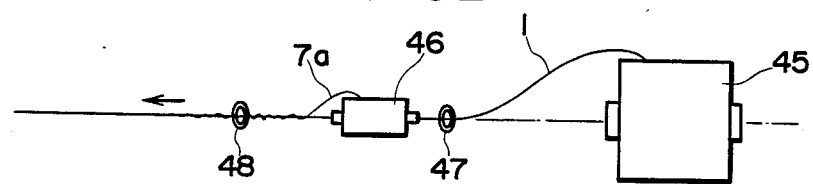

In this case, mail 43 of heald 41 and mail 44 of heald 42 are alternately arranged, and warp 1 is passed through each of the mails 43 and 44. To this warp 1, thermoplastic polymer yarn 7a is wound spirally. Thus, as shown in FIG. 102, a bobbin 45 of a warp 1 and a bobbin 46 of a thermoplastic polymer yarn 7a are prepared, the thermoplastic polymer yarn is joined to the warp sent through guides 47 and 48, the thermoplastic polymer yarn is automatically wound spirally around the warp by utilizing the twist due to the release of the thermoplastic polymer yarn. The warp 1 on which the thermoplastic polymer yarn 7a is spirally wound is passed through mail 43, another warp is passed through mail 44, and this is repeated. Then each of the warps 1 is passed through a corresponding reed 21.

Figure 103:
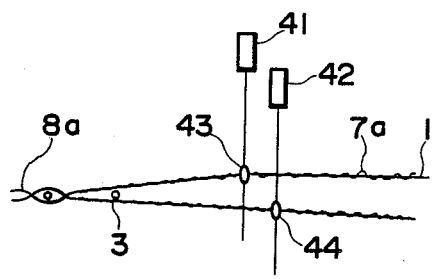
Figure 104:
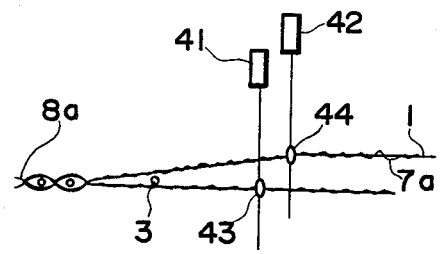

The shedding motion of the warps 1 and the insertion of the wefts 3 are performed as shown in FIGS. 103 and 104. In FIG. 103, heald 41 is lifted, heald 42 is brought down, and the weft 3 is inserted into the shed formed between the sheets formed by the warps and thermoplastic polymer yarns. The reed plates are then beaten up. The actions shown in FIGS. 103 and 104 are repeated. Thus the woven fabric substrate 8a is obtained.

Figure 105:
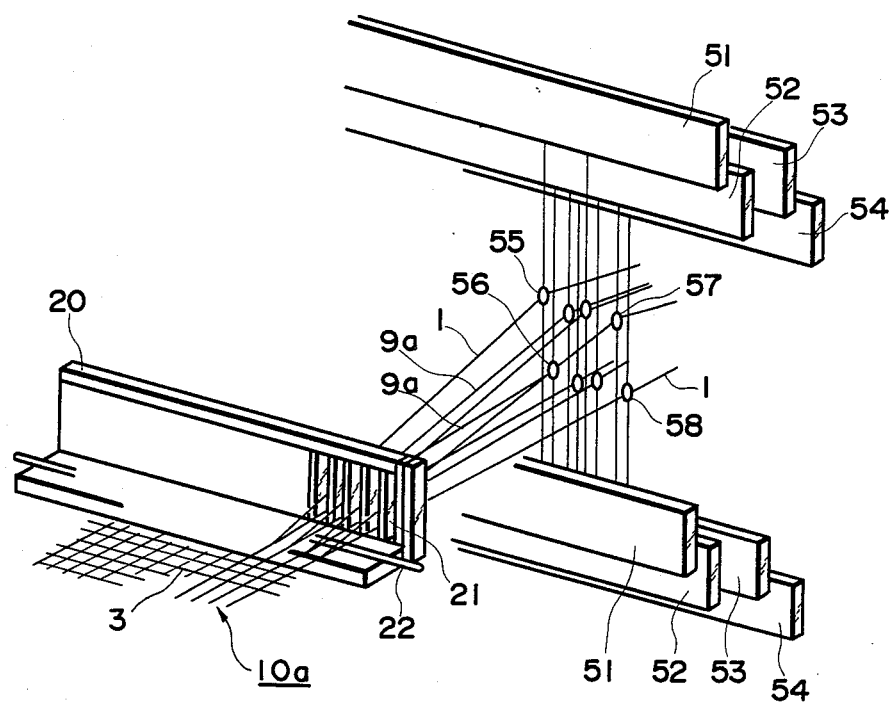
FIGS. 105–107 are schematic views illustrating the weaving of the woven fabric substrate shown in FIG. 4, FIG. 105 being a perspective view, FIG. 106 being a side view and FIG. 107 being a side view.
Figure 106:
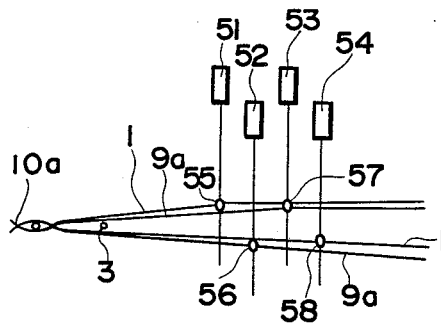
Figure 107:
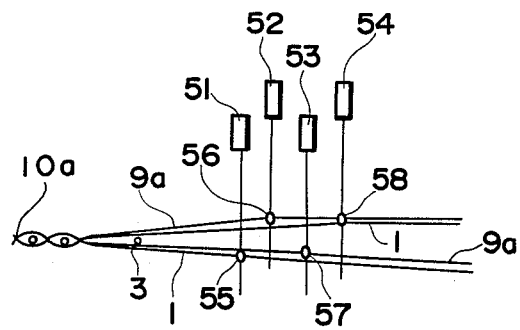

Next, in FIGS. 105-107, the manufacturing method for the woven fabric shown in FIG. 4 is explained.

In this case, as shown in FIG. 105, four healds 51, 52, 53 and 54 are prepared, and the healds 51 and 53, and similarly the healds 52 and 54, are moved in the same vertical direction. The warps 1 are passed through mails 55 and 58 of healds 51 and 54 respectively and the thermoplastic polymer yarns 9a are passed through mails 56 and 57 of healds 52 and 53, respectively. The mails 55, 56, 57 and 58 are arranged repeatedly in this order in the width direction of a woven fabric 10a. The warp 1 passed through mail 55 and the thermoplastic polymer yarn 9a passed through mail 56 are passed through a same reed 21 of the reed plate 20, and the warp passed through mail 58 and the thermoplastic polymer yarn passed through mail 57 are passed through a next same reed.

The insertion of wefts 3 is performed as shown in FIGS. 106 and 107. The healds 51 and 53 are lifted, the healds 52 and 54 are brought down, and the weft 3 is inserted into the shed formed between the sheets formed by the warps and the thermoplastic polymer yarns. Next, as shown in FIG. 107, the healds 51 and 53 are brought down, the healds 52 and 54 are lifted, a next weft is inserted, and then the beating-up motion is performed. The actions shown in FIGS. 106 and 107 are repeated. Thus a woven fabric 10a is obtained.

Next, bonding of woven fabric substrates to each other or bonding of a woven fabric substrate to another type of substrate is explained.

Figure 108:
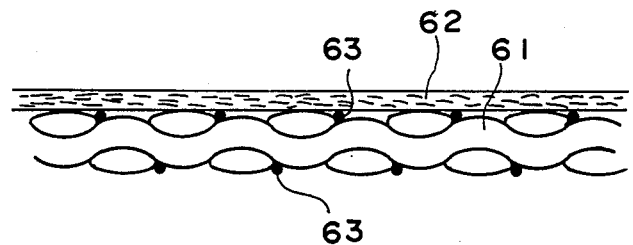
FIGS. 108–110 are schematic side views of laminated woven fabric substrates showing different laminations according to the present invention.
Figure 109:
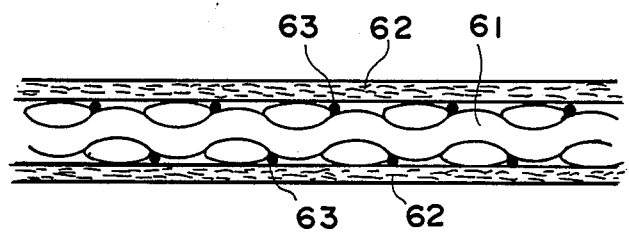
Figure 110:
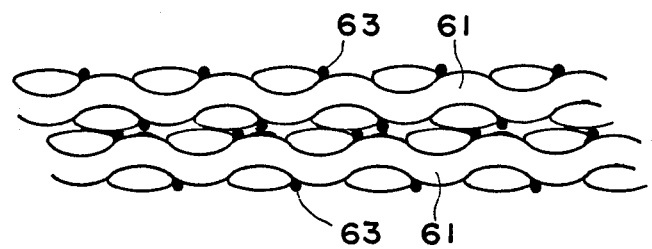

As shown in FIG. 108, a woven fabric substrate 61 comprised of reinforcing yarns of reinforcing fibers and having bonding material 63 composed of a thermoplastic polymer can be integrally bonded with a different type of substrate 62 not having such bonding material. Thus, by utilizing only the bonding material 63 in the woven fabric substrate 61, the bonding between both substrates can be achieved. This bonding and integrating of the substrates is completed by lamination and heating of the substrates as hereinafter described. As shown in FIG. 109, in the case where the substrate 61 is a substrate having bonding material 63 on both surfaces, other substrates 62 can be bonded on both of the surfaces of the substrate 61. Of course, as shown in FIG. 110, woven fabric substrates 61 having bonding material 63 according to the present invention can be integrally bonded to each other.

Such bonding and integrating of substrates is, for instance, performed as follows.

The woven fabric substrates having bonding material and cut to required sizes are laminated, or woven fabric substrates having bonding material and other type of substrates not having bonding material are alternately laminated. In these laminations, molds are used if necessary. After lamination, the laminated substrates are heated by an iron to a temperature higher than the melting point of the thermoplastic polymer constituting the bonding material, and are pressed at an appropriate pressure. By this heating and pressing, the laminated substrates are bonded and integrated via the bonding material, and thus a preformed material according to the present invention can be obtained. When the lamination is carried out, the directions of the reinforcing yarns constituting the substrates are set to required directions. In the case where the thermoplastic polymer constituting the bonding material tends to adhere to the iron, a mold releasing paper such as a silicon paper can be used to prevent such adhesion.

Next, typical embodiments of laminations of woven fabric substrates according to the present invention are explained in FIGS. 111-118, in accordance with a lamination of seven sheets of woven fabric substrates. However, the lamination structure is not restricted to the structures shown in FIGS. 111-118. The yarn weaving directions of a plurality of laminated woven fabric substrates may be all the same, and the yarn weaving direction of at least one of a plurality of laminated woven fabric substrates may be different from the yarn weaving directions of other substrates. The bonding material in the outermost substrates is preferably only situated on the surfaces of the outermost substrates which contact the inner substrates, but the bonding material in the outermost substrates may appear on both surfaces thereof.

In FIG. 111, seven laminated substrates are all the same woven fabric substrates 121. The reinforcing yarns 122 and 123 in all of the substrates 121 are arranged in the same directions at +45° and −45°, respectively, relative to the longitudinal direction 124 of the preformed material. Adjacent substrates are bonded to each other with bonding material of a thermoplastic polymer extending linearly. The bonding of adjacent substrates is not always perfomed over the whole surfaces thereof. Partial bonding on the surfaces may be adopted, for example, if only the central portions of the laminated substrates are bonded to each other. The end portions of the substrates can be opened after laminating and bonding and this is convenient to form, for example, flange portions of a beam with an I-shaped cross-section. Such a beam will be described later in FIG. 119.

In a structure shown in FIG. 112, a central woven fabric substrate 125 is a substrate comprising reinforcing yarns 126 and 127 extending in directions at 0° and 90°, respectively. On both surfaces of the substrate 125 are laminated unidirectional woven fabric substrates 130 having reinforcing yarns 128 extending in a direction at 90° and auxiliary filamentary yarns 129 (indicated with a broken line, hereinafter illustrated in the same manner) extending in a direction at 0°. On the outsides of both substrates 130 are laminated biased woven fabric substrates 133 having reinforcing yarns 131 and 132 extending in directions at 0° and −45°, respectively. Biased woven fabric substrates 136 having reinforcing yarns 134 and 135 extending in directions at 0° and −45°, respectively, are laminated as the outermost substrates. In the preformed material having such a lamination structure, since the orientation and arrangement of reinforcing yarns is symmetric relative to the central sheet of the lamination, no deformation after forming or curing occurs. Moreover, since the directions of orientation of reinforcing fibers are at 0°, +45°, −45° and 90°, artificial isotropic mechanical properties can be obtained.

In a structure shown in FIG. 113, a central woven fabric substrate 137 is a substrate comprising reinforcing yarns 138 and 139 extending in directions at 0° and 90°, respectively. On both surfaces of the substrate 137 are laminated unidirectional biased woven fabric substrates 142 having reinforcing yarns 140 extending in a direction at −45° and auxiliary filamentary yarns 141 extending in a direction at +45°. On the outsides of both substrates 142 are laminated unidirectional biased woven fabric substrates 145 having reinforcing yarns 143 extending in a direction at +45° and auxiliary filamentary yarns 144 extending in a direction at −45°. Woven fabric substrates 148 having reinforcing yarns 146 and 147 extending in directions at 0° and 90°, respectively, are laminated as the outermost substrates. In such a preformed material, no deformation occurs and artificial isotropic mechanical properties can be obtained as well as in the preformed material shown in FIG. 112.

In a structure shown in FIG. 114 there are laminated seven identical woven fabric substrates 149. The directions of reinforcing yarns 150 and 151 in each of the substrates 149 are set at 0° and 90° relative to the longitudinal direction 152 of the preformed material.

Figure 115:
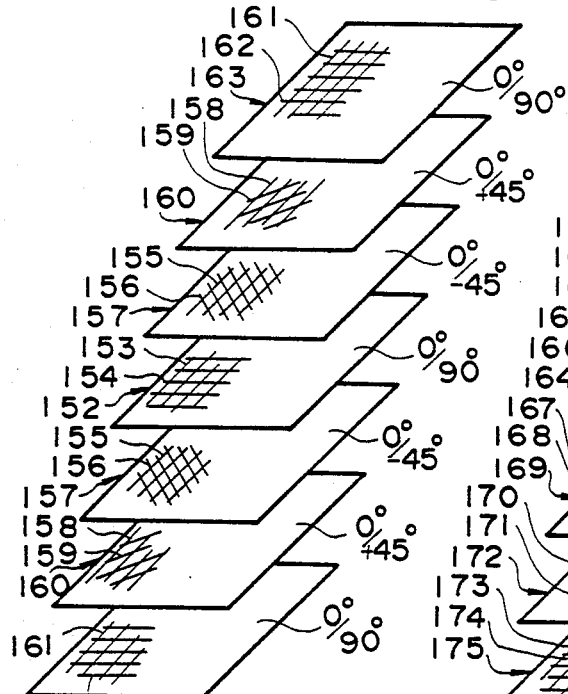

In a structure shown in FIG. 115, a central woven fabric substrate 152 is a substrate comprising reinforcing yarns 153 and 154 extending in directions at 0° and 90°, respectively. On both surfaces of the substrate 152 are laminated biased woven fabric substrates 157 having reinforcing yarns 155 and 156 extending in directions of at 0° and −45°, respectively. On the outsides of the substrates 157 are laminated biased woven fabric substrates 160 having reinforcing yarns 158 and 159 extending in directions at 0° and +45°, respectively. Woven fabric substrates 163 having reinforcing yarns 161 and 162 extending in directions at 0° and 90°, respectively, are laminated as the outermost substrates.

Figure 116:
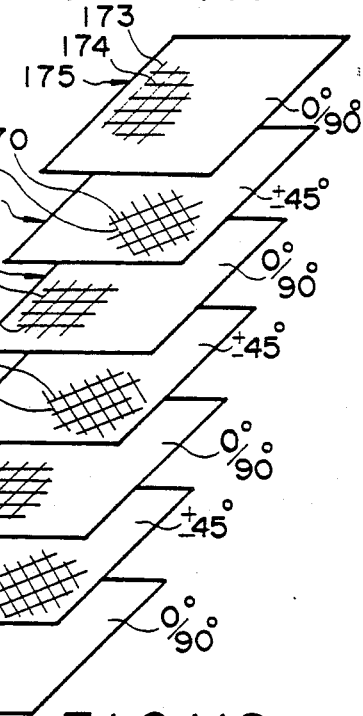

In a structure shown in FIG. 116, a central substrate 164 is a biased woven fabric substrate comprising reinforcing yarns 165 and 166 extending in directions at +45° and −45°, respectively. On both surfaces of the substrate 164 are laminated woven fabric substrates 169 having reinforcing yarns 167 and 168 extending in directions at 0° and 90°, respectively. On the outsides of the substrates 169 are laminated biased woven fabric substrates 172 having reinforcing yarns 170 and 171 extending in directions at +45° and −45°, respectively. Woven fabric substrates 175 having reinforcing yarns 173 and 174 extending in directions of 0° and 90°, respectively, are laminated as the outermost substrates.

Figure 117:
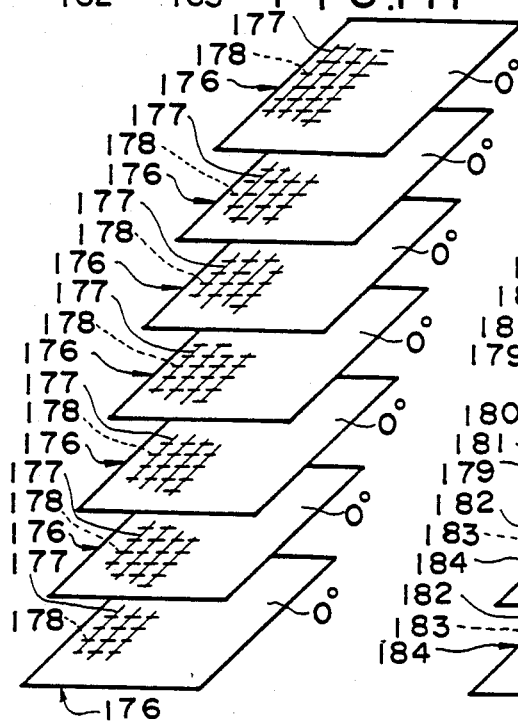

In a structure shown in FIG. 117, there are laminated seven identical woven fabric substrates 176. The direction of reinforcing yarns 177 in each of the substrates 176 is set to the longitudinal direction of the preformed material, and the direction of auxiliary filamentary yarns 178 is set to a direction at 90°.

Figure 118:
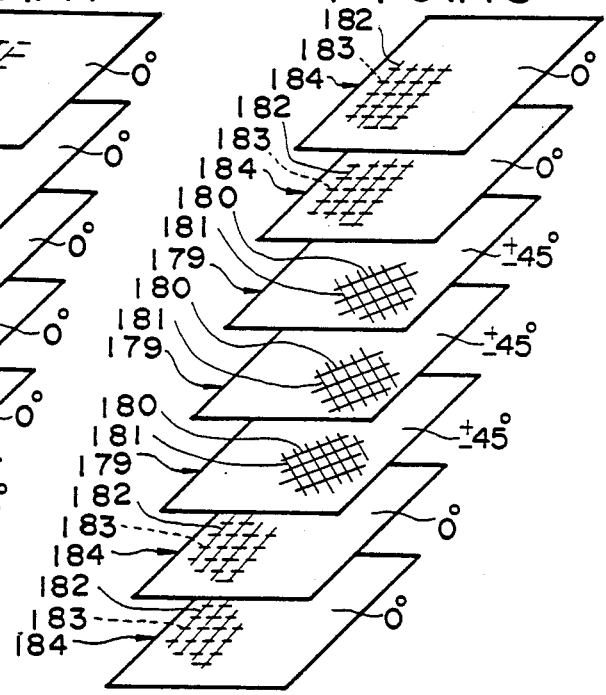

In a structure shown in FIG. 118 three central substrates 179 are biased woven fabric substrates comprising reinforcing yarns 180 and 181 extending in directions at +45° and −45°, respectively. On both outer surfaces of the three substrates are laminated two sheets of unidirectional woven fabric substrate 184 having reinforcing yarns 182 extending in a direction at 0° and auxiliary filamentary yarns 183 extending in a direction at 90°.

Then, the preformed material of the present invention is formed to a desired shape, corresponding to the shape of the FRP to be formed, as will be explained below.

Figure 119:
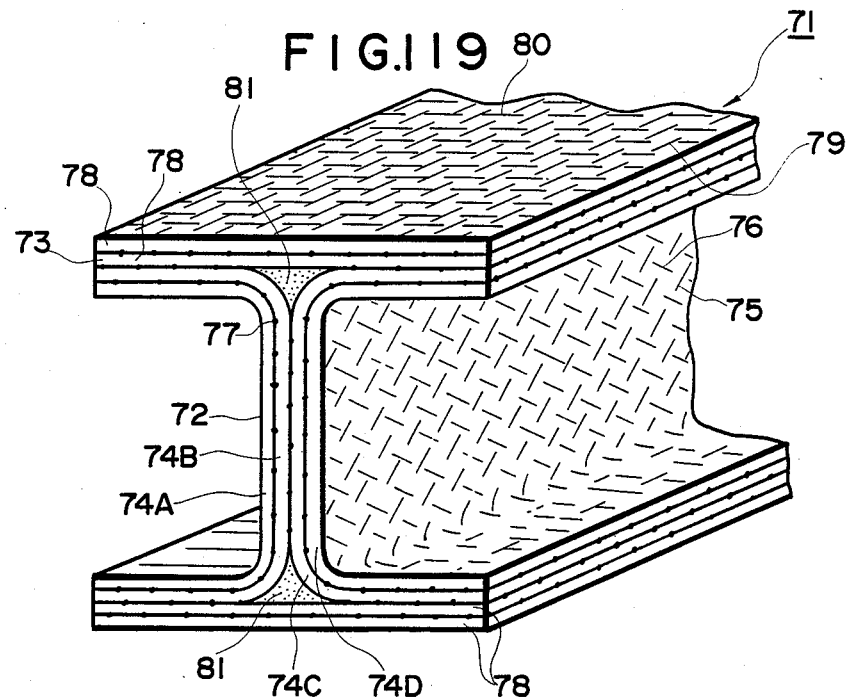
FIGS. 119–123 are schematic perspective views of preformed materials according to embodiments showing typical configurations according to the present invention.

FIG. 119 illustrates a preformed material for use in the formation of a beam of FRP with an I-shaped cross-section. The preformed material 71 is constructed of a lamination of woven fabric substrates integrally bonded to each other by bonding materials extending linearly and pre-adhered to the substrates. The preformed material 71 has an I-shaped cross-section and includes a web 72 and flanges 73.

More particularly, the laminated material comprises a plurality of plain weave substrates composed of reinforcing fibers, for example four plain weave substractes 74A, 74B, 74C and 74D. These four substrates 74A, 74B, 74C and 74D are laminated such that warps 75 and wefts 76 thereof extend substantially at angles of +45° and −45°, respectively, with respect to the longitudinal direction of the preformed material 71 in the web portion of the I-beam and are integrally bonded to each other by the bonding material 77 which extends in the longitudinal direction of the preformed material 71. The substrates 74A, 74B, 74C and 74D are bent in such a manner that the two flange portions of substrates 74A and 74B and the other two flange portions of substrates 74C and 74D extend in opposite directions, to produce an I-shape. Two further plain weave substrates 78 composed of reinforcing fibers, which are different from the substrates 74A to 74D, are put on each of the upper and lower surfaces of the I-shaped beam such that warps 79 and wefts 80 thereof extend substantially at angles of 0° and 90°, respectively, and are integrally bonded to the substrates 74A, 74B and substrates 74C, 74D by bonding material 77 extending in the longitudinal direction of the preformed material 71. Adjusting material composed of reinforcing fibers 81 is inserted into each of the spaces formed between the substrates 74B, 74C and substrate 78 at the bent portions of the substrates 74A to 74D, with the fibers directed to extend in the longitudinal direction of the preformed material 71.

Figure 120:
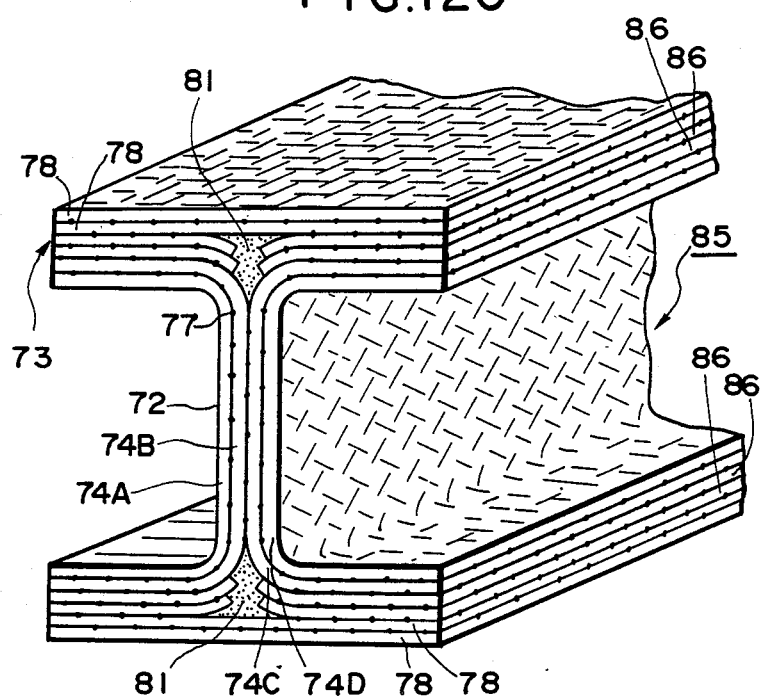

FIG. 120 illustrates one variation of the above-illustrated preformed material. In FIG. 120, a preformed material 85 further includes a plurality of unidirectional woven fabric substrates 86, each having all reinforcing fibers directed to extend in the longitudinal direction of the preformed material 85 and each having a width of half the entire width of each flange of the I-beam. The substrates 86 are interposed in twos between the upper flange portion of the substrate 74B and the substrates 78, between the upper-flange portion of the substrate 74C and the substrates 78, between the lower-flange portion of the substrate 74B and the substrates 78, and between the lower flange portion of the substrate 74C and the substrates 78.

Figure 121:
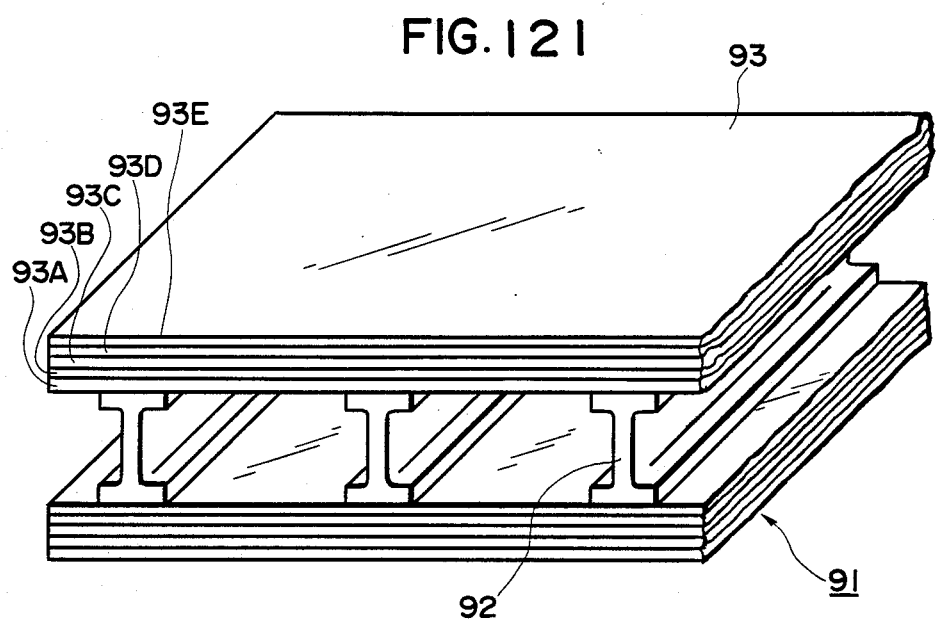

Next, another embodiment of the preformed material will be explained with reference to FIG. 121. The preformed material 91 in accordance with this embodiment comprises a plurality of beams 92 having an I-shaped cross-section as was illustrated in FIG. 119 and skin materials 93 which are bonded to the upper and lower surfaces of the beams 92. Each skin material 93 is composed entirely of plain weave substrates composed of reinforcing fibers.

Each skin material 93 comprises a lamination of a substrate 93A including warps and wefts arranged at angles of 0° and 90°, respectively, with respect to the longitudinal direction of the beam 92, a substrate 93B including warps and wefts arranged at angles of +45° and −45°, respectively, a substrate 93C including warps and wefts arranged at angles of 0° and 90°, respectively, a substrate 93D including warps and wefts arranged at angles of +45° and −45°, respectively, and a substrate 93E including warps and wefts arranged at angles of 0° and 90°, respectively. The substrates 93A to 93E are integrally bonded to each other by bonding material which linearly adheres to the substrates. The preformed material 91 thus constructed can be used for the formation of FRP structural members, for example, for aircraft.

Figure 122:
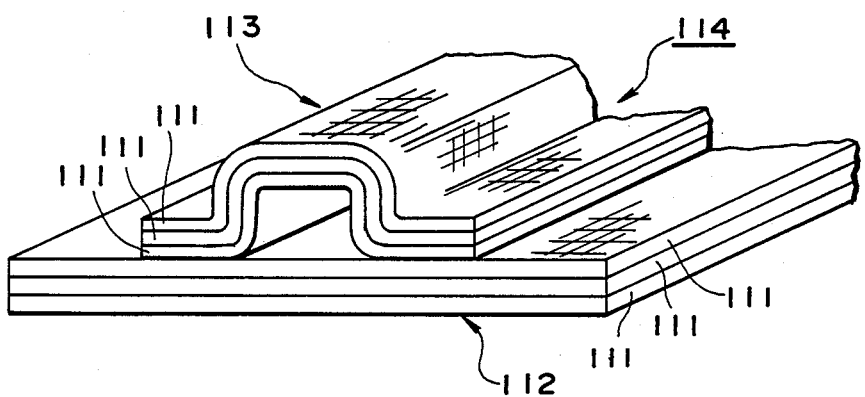

FIG. 122 illustrates a stiffening structure 114 as yet another embodiment of the present invention. In this embodiment, the stiffening structure 114 includes a base plate 112 composed of a triple-laminated structure of plain weave substrates 111 composed of reinforcing fibers, and a stiffener 113 for stiffening the base plate 112, which is also composed of a triple-laminated structure of plain weave substrates 111 composed of reinforcing fibers and is bent so as to have a U-shaped portion and flange portions extending from the ends of the legs of the U in directions away from the U-shaped portion. Each substrate 111 is integrally bonded to an adjacent substrate by bonding material extending linearly. The base plate 112 and the stiffener 113 are also bonded to each other by bonding material in the same manner as in the substrates 111. Such a stiffening structure can also be used for the formation of FRP stiffeners for aircraft.

Figure 123:
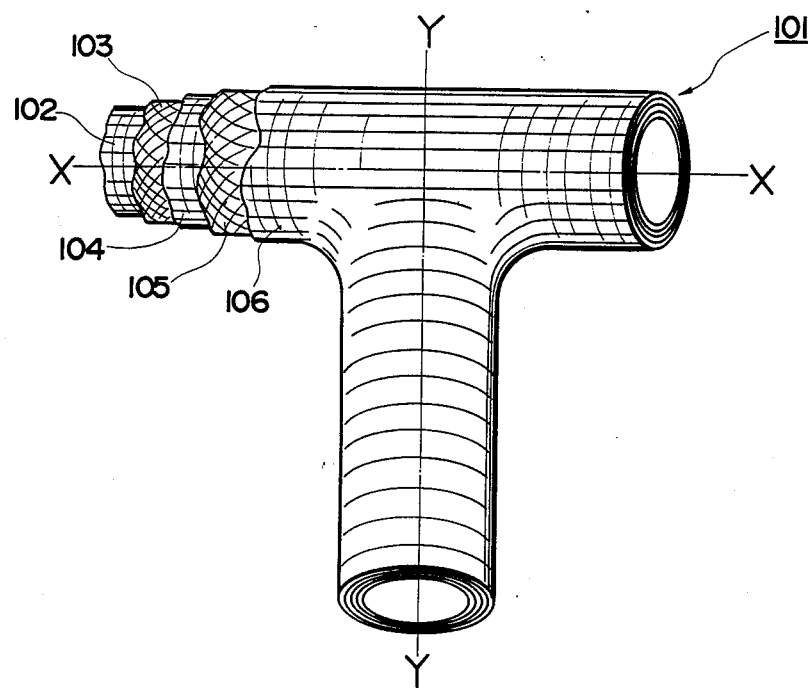

FIG. 123 illustrates a preformed material in accordance with yet another embodiment of the present invention and, more particularly, illustrates a preformed material 101 for use in the formation of a FRP T-type joint. The preformed material 101 is entirely composed of plain weave substrates composed of reinforcing fibers. The preformed material 101 comprises a substrate 102 including warps and wefts extending at angles of 0° and 90°, respectively, with respect to respective axes X-X and Y-Y, a substrate 103 including warps and wefts extending at angles of +45° and −45°, respectively, a substrate 104 including warps and wefts extending at angles of 0° and 90°, respectively, a substrate 105 including warps and wefts extending at angles of +45° and −45°, respectively, and a substrate 106 including warps and wefts extending at angles of 0° and 90°, respectively, which are arranged in the order 102, 103, 104, 105 and 106 from the inside of the T-joint and are integrally bonded to each other by bonding material composed of a thermoplastic polymer.

Next, a method for producing a FRP member using the preformed materials illustrated above is described.

First, the preformed materials are formed to a desired shape and are inserted into a mold. Then, a thermosetting resin at an A-stage or B-stage is injected into the mold and is impregnated into the preformed material. After the impregnation the resin is hardened by heating, that is, the resin is changed to the state of so-called C-stage, to produce an FRP having the shape of the preformed material. As the matrix resin of the FRP, for example, an epoxy resin, a non-saturated polyester resin, a phenolic resin or a polyimide resin can be used.

According to the preformed materials in accordance with the present invention, the following effects can be obtained:

Firstly, since the substrates of the substrates of the preformed materials are effectively integrally bonded to each other by the bonding material of a thermoplastic polymer, no deterioration will occur in the orientation and the distribution of the fibers and no dislocation of the substrates will occur due to the injected polymer when such an FRP is formed in a resin injection molding method. Further, when such an FRP is formed in a pultrusion molding method, no deformation and wrinkling will occur due to the weight of a polymer after its impregnation. As a result, desired orientation and distribution of reinforcing fibers can easily be obtained to provide an FRP having excellent characteristics.

Secondly, since the bonding material for bonding the substrates together adheres linearly, the amount of the bonding material is made as small as possible and, further, since the bonding material is substantially different from the matrix of an FRP, the characteristics of the FRP do not deteriorate due to such bonding material.

Thirdly, since woven fabric substrates are used in the preformed material, such a preformed material can easily be formed by, for example, an iron instrument, to enable a high efficiency of production even if the preformed material is of a complicated shape. In this connection, since the bonding material pre-adheres to the substrate by a very small amount, the draping property of the woven fabric substrates will not deteriorate to a great extent, which further increases the production efficiency. Accordingly, the preformed material according to the present invention can be formed to provide an FRP with a complicated shape, such as a chassis or a frame of a vehicle as well as FRP members as shown in FIGS. 119 to 123.

Finally, by using a woven fabric substrate wherein warps and wefts are fixed with a thermoplastic polymer as shown in FIGS. 1 to 3, not only does loosening not occur during handling or when the substrate is cut to make a preformed material, but also it becomes possible to maintain the original arrangement and distribution of the fabrics and to prevent the warps and the wefts from invading between the laminated substrates to deteriorate the characteristics of the FRP.

Although several preferred embodiments of the present invention have been described in detail, it will be appreciated by those skilled in the art that various modifications and alterations can be made to the particular embodiments shown without materially departing from the novel teachings are advantages of this invention. Accordingly, it is to be understood that all such modifications and alterations are included within the scope of the invention, provided they come within the scope of the appended claims and their equivalents.

What is claimed is:

1. A performed material for use in fiber reinforced plastics comprising:
    a plurality of sheet-like substrates comprising reinforcing fibers and laminated with each other, at least one of adjacent said substrates being a woven fabric substrate which has reinforcing yarns of reinforcing fibers extending at least in one direction, said reinforcing yarns are multifilaments and the cross sectional area of the reinforcing yarn is in the range of 0.03–0.60 $mm^2$; and
    bonding material composed of a thermoplastic polymer, said bonding material pre-adhering to said woven fabric substrates and extending substantially linearly, said bonding material being situated on at least one surface of a said woven fabric substrate and integrally bonding said woven fabric substrate and an adjacent said substrate, said bonding material is in the range of 0.2–10 wt. % of the reinforcing yarns, and said bonding material is formed by softening or melting one of yarns which are composed of a thermoplastic polymer and which have been woven into the woven fabric substrate together with the reinforcing yarns.

2. The preformed material of claim 1, wherein the reinforcing fibers used for said woven fabric substrate are selected from the group consisting of carbon fibers, glass fibers, polyaramide fibers, silicon carbide fibers, alumina fibers, alumina-silica fibers and metallic fibers.

3. The preformed material of claim 1, wherein said bonding material is composed of a thermoplastic polymer selected from the group consisting of nylon, copolymerized nylon, polyester, vinylidene chloride and vinyl chloride.

4. The preformed material of claim 3, wherein said copolymerized nylon is selected from the group consisting of copolymerized nylon 6 and nylon 12, copolymerized nylon 6 and nylon 66, copolymerized nylon 6, nylon 66 and nylon 610 and copolymerized nylon 6, nylon 12, nylon 66 and nylon 610.

5. The preformed material of claim 1, wherein adjacent said sheet-like substrates are both said woven fabric substrates having said pre-adhering bonding material.

6. The preformed material of claim 1, wherein one of adjacent said sheet-like substrates is said woven fabric substrate which has said pre-adhering bonding material, the other is a sheet-like substrate which does not have said pre-adhering bonding material, and both of the substrates are integrally bonded by said bonding material.

7. The preformed material of claim 6, wherein said other substrate is a substrate which comprises reinforcing fibers and which is selected from the group consisting of a woven fabric, a mat of short fibers, a mat of long fibers and a felt.

8. The preformed material of claim 1, wherein said bonding material in the outermost substrates of said plurality of substrates is situated only on the surfaces of said outermost substrates which contact the inner substrates of said plutality of substrates.

9. The preformed material of claim 1, wherein said plurality of substrates includes a plurality of said woven fabric substrates and the yarn weaving directions of said plurality of woven fabric substrates are all the same.

10. The preformed material of claim 1, wherein said plurality of substrates includes a plurality of said woven fabric substrates and the yarn weaving direction of at least one of said plurality of woven fabric substrates is different from the yarn weaving directions of other said woven fabric substrates.

11. The preformed material of claim 1, wherein said woven fabric substrate is a plain weave fabric having warps and wefts of said reinforcing yarns.

12. The preformed material of claim 1, wherein said woven fabric substrate is a twill weave fabric having warps and wefts of said reinforcing yarns.

13. The preformed material of claim 1, wherein said woven fabric substrate is a satin weave fabric having warps and wefts of said reinforcing yarns.

14. The preformed material of claim 11, 12 or 13, wherein said warps and wefts intersect each other substantially at right angles.

15. The preformed material of claim 11, 12 or 13, wherein either said warps or said wefts are biased so that said warps or said wefts may be arranged relative to the other at a constant angle of between 0 and 90 degrees.

16. The preformed material of claim 11, 12 or 13, wherein said bonding material extends substantially linearly along both said warps and said wefts.

17. The preformed material of claim 11, 12, or 13, wherein said bonding material extends along either said warps or said wefts in the same direction as said warps or wefts are threaded through said wefts or warps.

18. The preformed material of claim 17, wherein said warps or wefts to which said bonding material preadheres are multifilaments, and said bonding material extends along each corresponding said multifilament in the longitudinal direction of the multifilament at the central portion of the multifilament in the width direction thereof.

19. The preformed material of claim 18, wherein said bonding material is situated alternately on the front surface and on the back surface of successive said multifilaments.

20. The preformed material of claim 18, wherein all said bonding material is situated on only one surface of said multifilaments.

21. The preformed material of claim 17, wherein said bonding material extends along either said warps or said wefts on the side portions thereof.

22. The preformed material of claim 17, wherein said bonding material extends along either said warps or said wefts so as to spirally wind around said warps or wefts.

23. The preformed material of claim 17, wherein said bonding material extends along said wefts in random positions relative to said wefts.

24. The preformed material of claim 17, wherein said bonding material extends along all of either said warps or said wefts.

25. The preformed material of claim 17, wherein said bonding material extends along either said warps or said wefts at intervals of a plurality of yarns.

26. The preformed material of claim 17, wherein two or more substantially linear extents of said bonding material are present per said warp or said weft.

27. The preformed material of claim 17, wherein said bonding material extends continuously along either said warps or said wefts.

28. The preformed material of claim 17, wherein said bonding material extends intermittently along either said warps or said wefts.

29. The preformed material of claim 11, 12 or 13, wherein said bonding material extends along either said warps or said wefts in a direction opposite to the direction in which said warps or wefts are threaded through said wefts or warps.

30. The preformed material of claim 29, wherein said bonding material extends along all of either said warps or said wefts.

31. The preformed material of claim 29, wherein said bonding material extends along either said warps or said wefts at intervals of a plurality of yarns.

32. The preformed material of claim 29, wherein said bonding material extends continuously along either said warps or said wefts.

33. The preformed material of claim 29, wherein said bonding material extends intermittently along either said warps or said wefts.

34. The preformed material of claim 1, wherein said woven fabric substrate is a plain weave fabric formed by reinforcing yarns which extend in one direction parallel to one another and auxiliary filamentary yarns which hold said reinforcing yarns, and said bonding material extends along said auxiliary filamentary yarns.

35. The preformed material of claim 34, wherein said reinforcing yarns and said auxiliary filamentary yarns intersect each other at right angles.

36. The preformed material of claim 34, wherein said reinforcing yarns and said auxiliary filamentary yarns intersect each other at a constant angle of between 0 and 90 degrees.

37. The preformed material of claim 34, wherein said bonding material extends along said auxiliary filamentary yarns in a same direction as the direction in which said auxiliary filamentary yarns are threaded through said reinforcing yarns.

38. The preformed material of claim 37, wherein said bonding material extends along said auxiliary filamentary yarns so as to spirally wind around said auxiliary filamentary yarns.

39. The preformed material of claim 34, wherein said bonding material extends along said auxiliary filamentary yarns in a direction opposite to the direction in which said auxiliary filamentary yarns are threaded through said reinforcing yarns.

40. The preformed material of claim 37 or 38, wherein said bonding material extends along all of said auxiliary filamentary yarns.

41. The preformed material of claim 37 or 38, wherein said bonding material extends along said auxiliary filamentary yarns at intervals of a plurality of yarns.

42. The preformed material of claim 37 or 38, wherein said bonding material extends continuously along said auxiliary filamentary yarns.

43. The preformed material of claim 37 or 38, wherein said bonding material extends intermittently along said auxiliary filamentary yarns.

44. The preformed material of claim 1, wherein said woven fabric substrate is a woven fabric which comprises (a) a yarn group composed of a plurality of straight reinforcing yarns gathered in one direction parallel to one another in the form of a sheet and (b) first auxiliary filamentary yarns arranged intermediately between every two adjacent reinforcing yarns of said yarn group and extending in a direction parallel to said reinforcing yarns and second auxiliary filamentary yarns intersecting said reinforcing yarns, said first and second auxiliary filamentary yarns cooperatively holding said yarn group so as to form said woven fabric, and wherein said bonding material extends substantially linearly along either said first auxiliary filamentary yarns, said second auxiliary filamentary yarns or said reinforcing yarns, said bonding materials bonding said first auxiliary filamentary yarns and said second auxiliary filamentary yarns, or said reinforcing yarns and either said first or second auxiliary yarns, as well as bonding said woven fabric and said substrate adjacent to said woven fabric.

45. The preformed material of claim 1, wherein said woven fabric substrate is a woven fabric which comprises (a) a yarn group A composed of a plurality of straight reinforcing yarns gathered in one direction parallel to one another in the form of a sheet, (b) a yarn group B composed of a plurality of straight reinforcing yarns gathered in one direction parallel to one another in the form of a sheet, the sheet face of said yarn group B contacting the sheet face of said yarn group A and said reinforcing yarns of yarn group B intersecting said reinforcing yarns of yarn group A, and (c) auxiliary filamentary yarns which integrally hold said yarn group A and B so as to form said woven fabric, and wherein said bonding material extends substantially linearly along either said auxiliary filamentary yarns or said reinforcing yarns, said bonding material bonding said auxiliary filamentary yarns to each other or said auxiliary filamentary yarns and said reinforcing yarns as well as bonding said woven fabric and said substrate adjacent to said woven fabric.

46. The preformed material of claim 44, wherein said reinforcing yarns and said second auxiliary filamentary yarns intersect each other substantially at right angles.

47. The preformed material of claim 44, wherein said reinforcing yarns and said second auxiliary filamentary yarns intersect each other at a constant angle of between 0 and 90 degrees.

48. The preformed material of claim 45, wherein the reinforcing yarns of said yarn group A and the reinforcing yarns of said yarn group B intersect each other substantially at right angles.

49. The preformed material of claim 45, wherein the reinforcing yarns of said yarn group A and the reinforcing yarns of said yarn group B intersect each other at a constant angle of between 0 and 90 degrees.

50. The preformed material of claim 44 or 45, wherein said bonding material extends along said auxiliary filamentary yarns so as to spirally wind around said auxiliary filamentary yarns.

51. The preformed material of claim 44 or 45, wherein said bonding material extends along said auxiliary filamentary yarns in random positions relative thereto.

52. The preformed material of claim 44 or 45, wherein said bonding material extends along all the auxiliary filamentary yarns extending in one direction or along all the groups of reinforcing yarns defined by said auxiliary filamentary yarns and extending in one direction.

53. The preformed material of claim 44 or 45, wherein said bonding material extends along the auxiliary filamentary yarns extending in one direction or along the groups of reinforcing yarns defined by said auxiliary filamentary yarns and extending in one direction at intervals of a plurality of the auxiliary filamentary yarns or a plurality of the groups of reinforcing yarns.

54. The preformed material of claim 44 or 45, wherein said bonding material extends continuously.

55. The preformed material of claim 44 or 45, wherein said bonding material extends intermittently.

56. The preformed material of claim 1, wherein said cross sectional area is in the range 0.10–0.40 $mm^2$.

57. The preformed material of claim 1, wherein the weight of said woven fabric substrate is in the range 60–700 $g/m^2$.

58. The preformed material of claim 57, wherein said woven fabric weight is in the range 150–300 $g/m^2$.

* * * * *